US009357580B2

(12) United States Patent
Chiu et al.

(10) Patent No.: US 9,357,580 B2
(45) Date of Patent: May 31, 2016

(54) METHOD FOR SWITCHING COMMUNICATION CONNECTION MODE, COMMUNICATION SYSTEM, BASE STATION, TRANSMITTER AND RECEIVER

(71) Applicant: Industrial Technology Research Institute, Hsinchu (TW)

(72) Inventors: Chun-Yuan Chiu, Pingtung County (TW); Tzu-Ming Lin, Hsinchu County (TW)

(73) Assignee: Industrial Technology Research Institute, Hsinchu (TW)

(*) Notice: Subject to any disclaimer, the term of this patent is extended or adjusted under 35 U.S.C. 154(b) by 135 days.

(21) Appl. No.: 14/172,917

(22) Filed: Feb. 5, 2014

(65) Prior Publication Data

US 2014/0219198 A1 Aug. 7, 2014

Related U.S. Application Data

(60) Provisional application No. 61/762,239, filed on Feb. 7, 2013.

(30) Foreign Application Priority Data

Jan. 2, 2014 (TW) .............................. 103100057 A

(51) Int. Cl.
H04W 76/04 (2009.01)
H04W 76/02 (2009.01)
(52) U.S. Cl.
CPC ............ H04W 76/04 (2013.01); H04W 76/023 (2013.01)
(58) Field of Classification Search
CPC .................................................. H04W 76/04
See application file for complete search history.

(56) References Cited

U.S. PATENT DOCUMENTS 8,213,360 B2 * 7/2012 Koskela et al. ............... 370/328
8,355,331 B2 1/2013 Chun et al.
(Continued)

FOREIGN PATENT DOCUMENTS

| CN | 101389119 | 3/2009 |
| TW | 200910842 | 3/2009 |
| WO | 2012079621 | 6/2012 |

OTHER PUBLICATIONS

3rd Generation Partnership Project (3GPP), "Feasibility Study for Proximity Services (ProSe)," Technical Report TR 22.803 V1.0.0, Aug. 2012, pp. 1-33.

(Continued)

Primary Examiner — Mohammad Anwar
(74) Attorney, Agent, or Firm — Jianq Chyun IP Office

(57) ABSTRACT

A method for switching communication connection modes, a communication system, a base station, a transmitter and a receiver are provided. The method includes the following steps. Firstly, when a base station or a core network entity determines that a communication mode between a transmitter and a receiver should be switched from a cellular communication mode to a device-to-device communication mode, the base station sends a control message to the transmitter. Next, the transmitter stops transmitting at least one first packet to the base station in response to the control message. Afterwards, the receiver receives at least one transmission-unfinished packet and a transmission-unfinished packet status related to the at least one transmission-unfinished packet forwarded by the base station.

53 Claims, 22 Drawing Sheets

(56) References Cited

U.S. PATENT DOCUMENTS

| | | |
|---|---|---|
| 2004/0127214 A1 | 7/2004 | Reddy et al. |
| 2011/0228746 A1 | 9/2011 | Chun et al. |
| 2012/0020213 A1 | 1/2012 | Horneman et al. |
| 2012/0106517 A1 | 5/2012 | Charbit et al. |
| 2012/0182907 A1 | 7/2012 | Li et al. |
| 2013/0029712 A1 | 1/2013 | Shao et al. |
| 2013/0135987 A1 | 5/2013 | Wang et al. |
| 2013/0295936 A1* | 11/2013 | Zhang et al. .................. 455/436 |
| 2013/0324114 A1* | 12/2013 | Raghothaman et al. ... 455/426.1 |

OTHER PUBLICATIONS

Klaus Doppler et al., "Device-to-Device communications; functional prospects for LTE-Advanced networks," IEEE International Conference on Communications (ICC) Workshops, Jan. 2009, pp. 1-6.

Klaus Doppler et al., "Device-to-Device Communication as an Underlay to LTE-Advanced Networks," IEEE Communications Magazine: Topics in Radio Communications, Dec. 2009, pp. 1-8.

Gabor Fodor et al., "Design Aspects of Network Assisted Device-to-Device Communications," IEEE Communications Magazine: Accepted From Open Call, Mar. 2012, pp. 1-8.

M. Scott Corson et al., "Toward Proximity-Aware Internetworking," IEEE Wireless Communications: The Internet of Things, Dec. 2010, pp. 1-8.

3rd Generation Partnership Project (3GPP), "Evolved Universal Terrestrial Radio Access (E-UTRA) and Evolved Universal Terrestrial Radio Access Network (E-UTRAN); Overall description," Technical Specification TS 36.300 V11.5.0, Mar. 2013, pp. 1-209.

3rd Generation Partnership Project (3GPP), "Evolved Universal Terrestrial Radio Access (E-UTRA); Packet Data Convergence Protocol (PDCP) specification," Technical Specification TS 36.323 V11.1.0, Dec. 2012, pp. 1-27.

* cited by examiner

METHOD FOR SWITCHING COMMUNICATION CONNECTION MODE, COMMUNICATION SYSTEM, BASE STATION, TRANSMITTER AND RECEIVER

CROSS-REFERENCE TO RELATED APPLICATION

This application claims the priority benefits of U.S. provisional application Ser. No. 61/762,239, filed on Feb. 7, 2013 and Taiwan application serial no. 103100057, filed on Jan. 2, 2014. The entirety of each of the above-mentioned patent applications is hereby incorporated by reference herein and made a part of this specification.

BACKGROUND

1. Technical Field

The present disclosure relates to a method for switching communication methods, a communication system, a base station, a transmitter and a receiver, and more particularly, to a method for switching communication connection modes, a communication system, a base station, a transmitter and a receiver.

2. Description of Related Art

With widespread of mobile broadband applications and demands for transmitting massive amounts of data, resource of radio spectrum has become increasingly scarce. In order to solve said problem, technique of creating available bandwidths from space domain has been developed. Thus, 3rd Generation Partnership Project (3GPP) has been focusing on feasibility of supporting Device-to-Device (D2D) communication in Long Term Evolution-Advanced (LTE-A) standard and the establishment of system requirements. The D2D communication is a new technique which allows User Equipments (UE) to directly communicate with adjacent UEs by using licensed bands or unlicensed bands (for example, Wireless Local Area Networks (WLAN)) in conjunction with heterogeneous networks after proximity discovery under the control of a wireless communication system. The D2D communication technique may increase a system spectral efficiency and reduce a transmitted power of each terminal, so as to solve the problem of scarce resource of radio spectrum in the wireless communication system. In addition, the D2D communication technique may also satisfy requirements of proximity communications, such as electronic flyers and alarm systems, in some commercial applications and during disaster relief.

FIG. 1A illustrates a cellular communication method of conventional art. As shown in FIG. 1A, when a UE 110 intends to transmit data to an UE 120, the data can only be transmitted to the UE 120 after being sequentially forwarded by a base station 130, a network entity 140 and a base station 150. In other words, a traditional cellular communication connection is used between the UEs 110 and 120 for transmitting the data.

When a distance between the UEs 110 and 120 is reduced to fall within a specific range, the base station 130 (or the base station 150) may then switch a communication method between the UEs 110 and 120 to a D2D communication as shown in FIG. 1B.

FIG. 1B is a schematic view illustrating a conventional device-to-device communication. It could be observed from FIG. 1B that the UEs 110 and 120 may transmit the data to each other without forwarding the data via the base station 130, the network entity 140 and the base station 150, thereby achieving an effect of network offloading.

Further, when the base station 130 (or the base station 150) determines that the UEs 110 and 120 cannot continue the D2D communication for being too far from each other, the communication method between the UEs 110 and 120 may still be switched back to the traditional cellular communication connection as shown in FIG. 1A.

Based on a system requirement of the D2D communication defined by the 3GPP, it is required that the LTE-A has capabilities in establishing the D2D communication connection for one UE, controlling radio sources used in the D2D communication connection, and switching the communication connections between the D2D communication connection and the traditional cellular communication connection without affecting quality of service (QoS).

In the LTE-A, a bearer is responsible for transmitting the data between two network entities. A data stream between the UE and Packet Data Network Gateway (P-GW) is transmitted by an Evolved Packet System (EPS) bearer.

FIG. 2 is a schematic diagram of a data stream between a plurality of network entities in the conventional LTE-A. The network entities include, for example, the UE, Evolved Node B (eNB), Serving Gateway (S-GW), Packet Data Network Gateway (P-GW) and Peer Entity. Among these network entities, the UE and the eNB belong to, for example, Evolved Universal Terrestrial Radio Access Network (E-UTRAN), and the S-GW and the P-GW belong to, for example, Evolved Packet Core (EPC). The Peer Entity is, for example, a network entity that performs an end-to-end service with the UE.

As shown in FIG. 2, EPS radio bearer (RB) is a logic bearer formed by serially connecting three entity bearer including radio bearer, S1 bearer, and S5/S8 bearer. When each EPS radio bearer is established, the P-GW may configure a set of corresponding QoS parameters, and the eNB may schedule the data streams in different EPS Radio Bearers according to the QoS parameters, so as to meet QoS requirements. With respect to the UE, the data streams having the different QoS requirements may use different EPS radio bearers for achieving different quality of services. Therein, the radio bearer is responsible for transmitting the data between the eNB and the UE, and radio bearer includes Packet Data Convergence Protocol (PDCP) layer and Radio Link Control (RLC) layer. When the EPS radio bearer is established with more stringent requirement in Packet Error loss Rate (PELR), the eNB may use the Acknowledge Mode (AM) to transmit the data at a RLC entity of the corresponding radio bearer (i.e., a retransmitting mechanism of Automatic Repeat-reQuest (ARQ) is operated at the RLC layer).

However, when the communication method between the UEs is switched from the cellular communication connection to the D2D communication connection, it is obvious that the radio bearers between the eNB and the UEs are no longer suitable in use for the D2D communication connection. In this case, how to meet the more stringent requirement in the Packet Error loss Rate (PELR) during process of switching from the traditional cellular communication connection to the D2D communication connection is indeed an important issue to be solved.

SUMMARY

The disclosure is directed to a method for switching communication connection modes, and adapted to a communication system including a transmitter, a receiver and at least one base station. The method includes the following steps. Firstly, when at least one base station or a core network entity determines that a communication mode between a transmitter and a receiver should be switched from a cellular communication mode to a device-to-device communication mode, sending, by the at least one base station, a control message to the transmitter. Next, stopping transmitting, by the transmitter, at least one first packet to the at least one base station in response to the control message. Afterwards, receiving, by the receiver, at least one transmission-unfinished packet and a transmission-unfinished packet status related to the at least one transmission-unfinished packet forwarded by the at least one base station.

The disclosure provides a communication system, which includes a transmitter, a receiver and at least one base station. When at least one base station or a core network entity determines that a communication mode between a transmitter and a receiver should be switched from a cellular communication mode to a device-to-device communication mode, the at least one base station sends a control message to the transmitter. The transmitter stops transmitting at least one first packet to the at least one base station in response to the control message. The receiver receives at least one transmission-unfinished packet and a transmission-unfinished packet status related to the at least one transmission-unfinished packet forwarded by the at least one base station.

The disclosure provides a base station, which includes a communication unit, a storage unit, and a processing unit. The storage unit stores a plurality of program codes. The processing unit connects to the storage unit and the communication unit, and accesses the program codes to perform steps of: when the base station or a core network entity determines that a communication mode between a transmitter and a receiver requires to be switched from a cellular communication mode to a device-to-device communication mode, sending a control message to the transmitter, so as to control the transmitter to stop transmitting at least one first packet to the base station; and forwarding at least one transmission-unfinished packet and a transmission-unfinished packet status related to the at least one transmission-unfinished packet to the receiver.

The disclosure provides a receiver, which includes a communication unit, a storage unit, and a processing unit. The storage unit stores a plurality of program codes. The processing unit connects to the storage unit and the communication unit, and accesses the program codes to perform steps of: when at least one base station or a core network entity determines that a communication mode between a transmitter and the receiver requires to be switched from a cellular communication mode to a device-to-device communication mode, receiving at least one transmission-unfinished packet and a transmission-unfinished packet status related to the at least one transmission-unfinished packet forwarded by the at least one base station.

The disclosure is directed to a method for switching communication connection modes, and adapted to a communication system including a transmitter, a receiver and at least one base station. The method includes the following steps. Firstly, when at least one base station or a core network entity determines that a communication mode between a transmitter and a receiver should be switched from a device-to-device communication mode to a cellular communication mode, sending, by the at least one base station, a control message to the transmitter. Next, stopping transmitting, by the transmitter, at least one first packet to the receiver in response to the control message. Afterwards, forwarding, by the transmitter, at least one transmission-unfinished packet and a transmission-unfinished packet status related to the at least one transmission-unfinished packet to the at least one base station.

The disclosure provides a communication system, which includes a transmitter, a receiver and at least one base station. When at least one base station or a core network entity determines that a communication mode between a transmitter and a receiver should be switched from a device-to-device communication mode to a cellular communication mode, the at least one base station sends a control message to the transmitter. The transmitter stops transmitting at least one first packet to the receiver in response to the control message. The transmitter forwards at least one transmission-unfinished packet and a transmission-unfinished packet status related to the at least one transmission-unfinished packet to the at least one base station.

The disclosure provides a base station, which includes a communication unit, a storage unit, and a processing unit. The storage unit stores a plurality of program codes. The processing unit connects to the storage unit and the communication unit, and accesses the program codes to perform steps of: when the base station or a core network entity determines that a communication mode between a transmitter and a receiver requires to be switched from a device-to-device communication mode to a cellular communication mode, sending a control message to the transmitter, so as to control the transmitter to stop transmitting at least one first packet to the receiver; and receiving at least one transmission-unfinished packet and a transmission-unfinished packet status related to the at least one transmission-unfinished packet forwarded by the transmitter.

The disclosure provides a transmitter, which includes a communication unit, a storage unit, and a processing unit. The storage unit stores a plurality of program codes. The processing unit connects to the storage unit and the communication unit, and accesses the program codes to perform steps of: when at least one base station or a core network entity determines that a communication mode between the transmitter and a receiver requires to be switched from a device-to-device communication mode to a cellular communication mode, receiving a control message from the at least one base station; stopping transmitting at least one first packet to the receiver in response to the control message, and forwarding at least one transmission-unfinished packet and a transmission-unfinished packet status related to the at least one transmission-unfinished packet to the at least one base station.

The disclosure is directed to a method for switching communication connection modes, and adapted to a communication system including a transmitter, a receiver and at least one base station. The method includes the following steps. Firstly, when at least one base station or a core network entity determines that a communication mode between a transmitter and a receiver should be switched from a device-to-device communication mode to a cellular communication mode, sending, by the at least one base station, a control message to the transmitter and the receiver. Next, stopping transmitting, by the transmitter, at least one first packet to the receiver in response to the control message. Afterwards, forwarding, by the receiver, at least one transmission-unfinished packet and a transmission-unfinished packet status related to the at least one transmission-unfinished packet to the at least one base station in response to the control message.

The disclosure provides a communication system, which includes a transmitter, a receiver and at least one base station. When at least one base station or a core network entity determines that a communication mode between a transmitter and a receiver should be switched from a device-to-device communication mode to a cellular communication mode, the at least one base station sends a control message to the transmitter and the receiver. The transmitter stops transmitting at least one first packet to the receiver in response to the control message. The receiver forwards at least one transmission-unfinished packet and a transmission-unfinished packet status related to the at least one transmission-unfinished packet to the at least one base station in response to the control message.

The disclosure provides a base station, which includes a communication unit, a storage unit, and a processing unit. The storage unit stores a plurality of program codes. The processing unit connects to the storage unit and the communication unit, and accesses the program codes to perform steps of: when the base station or a core network entity determines that a communication mode between a transmitter and a receiver requires to be switched from a device-to-device communication mode to a cellular communication mode, sending a control message to the transmitter and the receiver, so as to control the transmitter to stop transmitting at least one first packet to the receiver; and controlling the receiver to forward at least one transmission-unfinished packet and a transmission-unfinished packet status related to the at least one transmission-unfinished packet to the base station.

The disclosure provides a receiver, which includes a communication unit, a storage unit, and a processing unit. The storage unit stores a plurality of program codes. The processing unit connects to the storage unit and the communication unit, and accesses the program codes to perform steps of: when at least one base station or a core network entity determines that a communication mode between the transmitter and a receiver requires to be switched from a device-to-device communication mode to a cellular communication mode, receiving a control message from the at least one base station; forwarding at least one transmission-unfinished packet and a transmission-unfinished packet status related to the at least one transmission-unfinished packet to the at least one base station in response to the control message.

Based on above, when the communication mode between the transmitter and the receiver is switched from the cellular communication mode to the device-to-device communication mode, or switched from the device-to-device communication mode to the cellular communication mode, the methods proposed according to the embodiments of the disclosure are capable of reducing the packet error loss rate by the transmission-unfinished packet and the transmission-unfinished packet status forwarded by the transmitter, the receive and/or the base station.

To make the above features and advantages of the present disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION

Figure 1A:
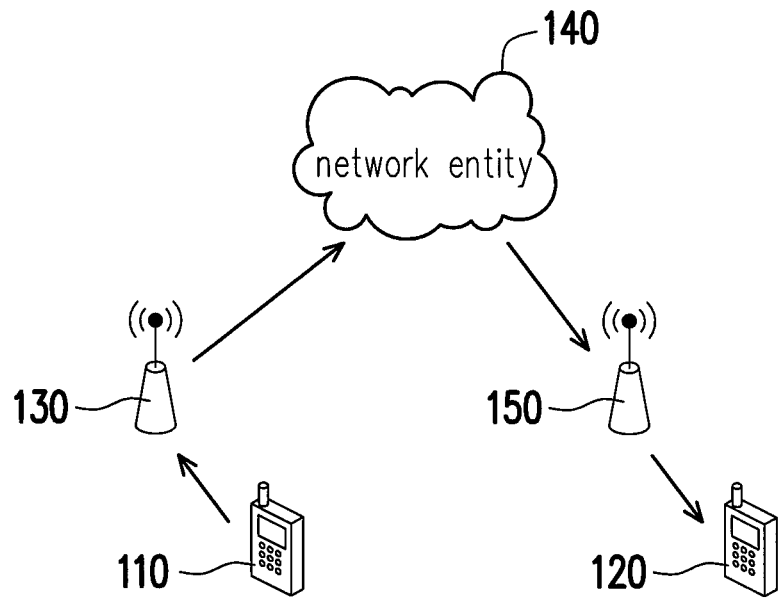
FIG. 1A illustrates a cellular communication method of conventional art.
Figure 1B:
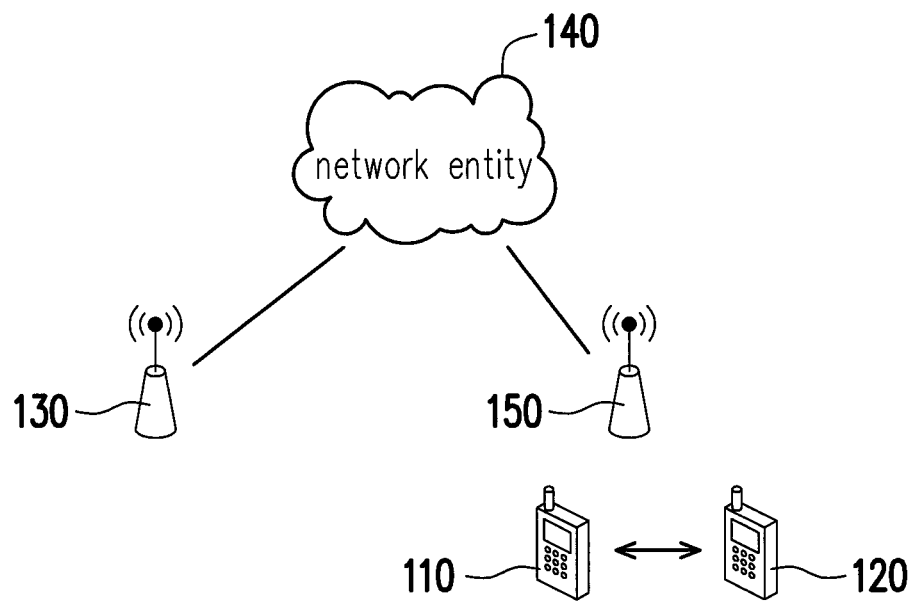
FIG. 1B is a schematic view illustrating a conventional device-to-device communication.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 3A:
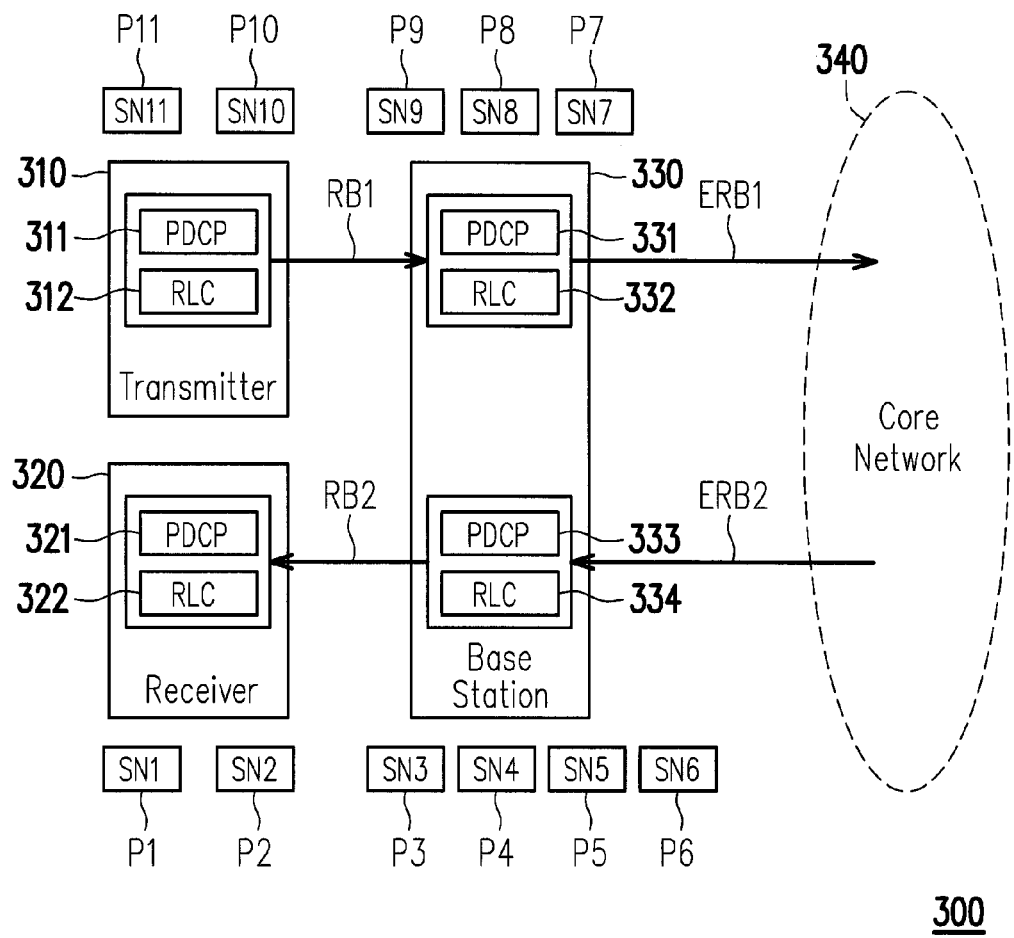
FIG. 3A is a schematic diagram illustrating a cellular communication according to an embodiment of the present disclosure.

FIG. 3A is a schematic diagram illustrating a cellular communication according to an embodiment of the present disclosure. In the present embodiment, a communication system 300 includes a transmitter 310, a receiver 320 and a base station 330. The base station 330 is, for example, an enhanced node B (eNodeB), an advanced base station (ABS), a macro-cell base station, a pico-cell base station, or a remote radio head (RRH). Each of the transmitter 310 and the receiver 320 is, for example, a mobile station, an advanced mobile station (AMS), or a wireless terminal communication device.

In addition, each of the transmitter 310 and the receiver 320 may be a cell phone, a smart phone, a tablet PC, a portable device any electronic device or user equipment which are capable of communicating with others in a cellular communication mode or a device-to-device communication mode.

In each embodiment according to present disclosure, it is assumed that a communication standard of the cellular communication used between each of the devices is LTE. Further, as taught previously, the radio bearer may be used for transmitting packets between the devices communicating though the LTE standard. Take the transmitter 310 and the base station 330 in FIG. 3A as an example, a Packet Data Convergence Protocol (PDCP) entity 311 and a Radio Link Control (RLC) entity 312 in the transmitter 310 may correspondingly communicate with a PDCP entity 331 and a RLC entity 332 in the base station 330 via a radio bearer RB1, so as to transmit the packets to the base station 330. Next, the base station 330 may transmit the packets from the transmitter 310 to a core network 340 (e.g., the Evolved Packet Core Network (EPC)) via an EPS radio bearer ERB1, for routing the packets to the receiver 320.

Figure 2:
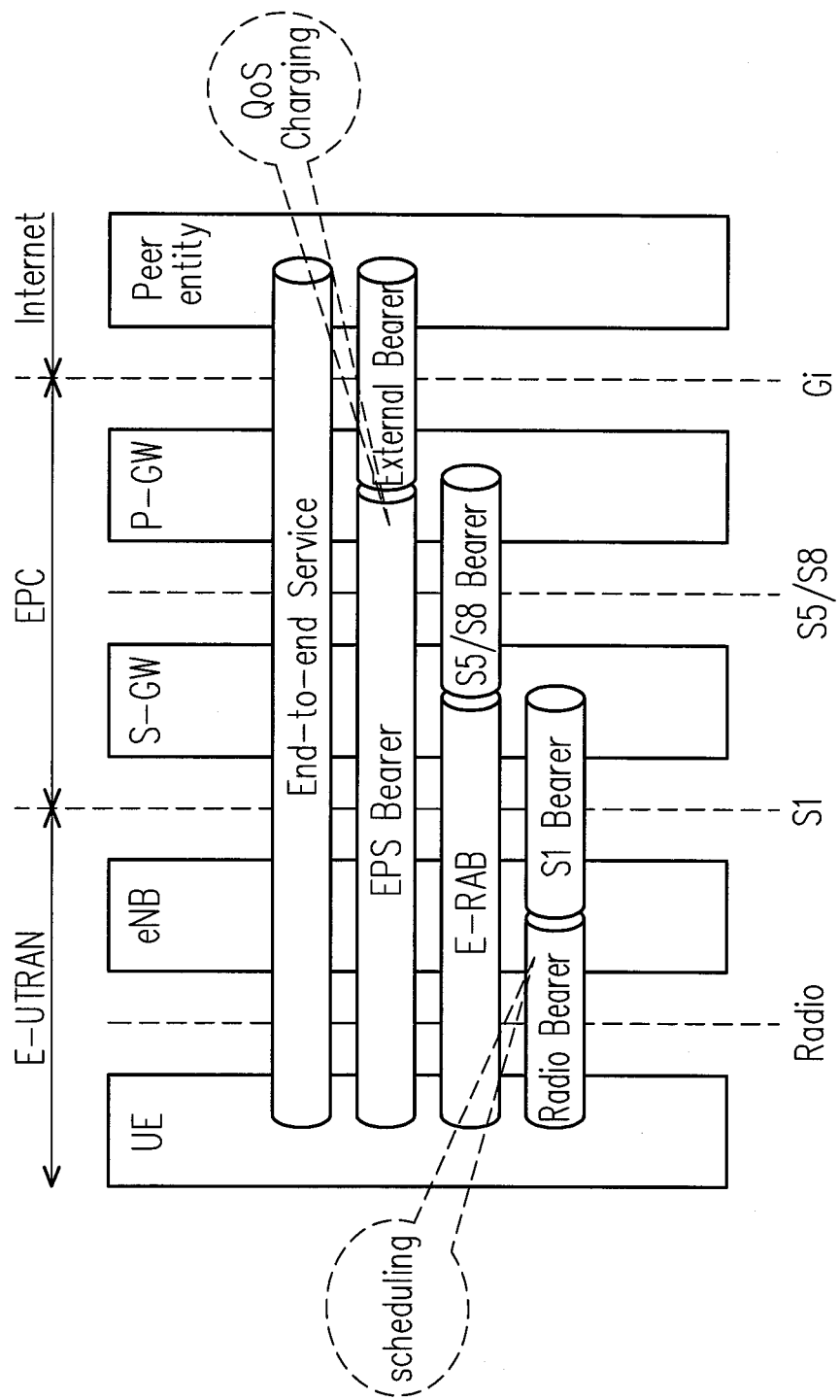
FIG. 2 is a schematic diagram of a data stream between a plurality of network entities in the conventional LTE-A.

As shown in FIG. 2, the core network 340 of FIG. 3A may also include network entities such as an S-GW (not illustrated) and a P-GW (not illustrated), and the network entities may facilitate in forwarding the packets from the transmitter 310 to a destination such as the receiver 320. In the present embodiment, the base station 330 is used as the base station for serving the receiver 320 and the transmitter 310, thus the core network 340 may route the packets from the transmitter 310 to the base station 330 via, for example, an EPS radio bearer ERB2. Next, a PDCP entity 333 and a RLC entity 334 in the base station 330 may then communicate with the PDCP entity 321 and the RLC entity 322 in the receiver 320 via the radio bearer ERB2, thereby transmitting the packets from the transmitter 310 to the receiver 320.

Based on the mechanism taught in the foregoing embodiment, the transmitter 310 may transmit packets P1 to P11 sequentially to the receiver 320 via the base station 330 and the core network 340.

It should be noted that, each of the packets sent by the transmitter 310 is configured with a PDCP sequence number for representing a sequence of the packets. Take FIG. 3A as an example, the PDCP sequence numbers of the packets P1 to P11 are, for example, SN1 to SN11. More specifically, when the PDCP entity 311 in the transmitter 310 receives the packets from an upper layer (e.g., Transmission Control Protocol/Internet Protocol (TCP/IP) layer), the PDCP entity 311 may sequentially number the packets, and transmit the numbered packets to the RLC entity 312. At the time, if the RLC entity 312 is operated under said acknowledge mode, the PDCP entity 311 may also back up the numbered packets. Afterwards, after the RLC entity 312 has confirmed that the packet with a specific number is transmitted to the destination (e.g., the base station 330), the RLC entity 312 may inform the PDCP entity 311 to delete the corresponding backed up packet. In addition, despite that only the PDCP entity and the RLC entity are illustrated in each device depicted in FIG. 3A, persons with ordinary skill in the art should be understood that each device depicted in FIG. 3A may include entities such as those in Medium Access Control (MAC) layer and Physical layer.

In an embodiment, if the packets received by the base station 330 from the transmitter 310 are out-of-sequence, the base station 330 may temporarily store said packets until the temporarily stored packets are changed to be in-sequence, so that the temporarily stored packets may be sequentially sent to the core network 340. More specifically, although the packets are sequentially sent by the transmitter 310 to the base station 330 via the radio bearer RB1, the packets received by the base station 330 may still be out-of-sequence because a part of the packets is not received by the base station 330 due to channels, noises, or other factors. Meanwhile, because the packets sent by the base station 330 to the core network 340 must be in-sequence, the base station 330 may temporarily store the out-of-sequence packets, and inform the transmitter 310 to retransmit the part of the packets which is not received by the base station 330. Next, when the base station 330 receives the packets retransmitted by the transmitter 310, and determines that all of the received packets are recovered back to in-sequence, the base station 330 may then continue to send the in-sequence packets to the core network 340 via the EPS radio bearer ERB1.

In the present embodiment, while the base station 330 is facilitating in forwarding the packets sent by the transmitter 310 to the receiver 320, the base station 330 may also monitor a condition of device-to-device communication channels between the transmitter 310 and the receiver 320, so as to determine whether it is possible to switch the communication mode between the transmitter 310 and the receiver 320 from the cellular communication mode to the device-to-device communication mode. More specifically, both the transmitter 310 and the receiver 320 may measure the condition of the device-to-device communication channels between each other, and report a measured result thereof back to the base station 330. When the base station 330 determines that a signal quality of the device-to-device communication channels between the transmitter 310 and the receiver 320 is higher than a first preset threshold value, the base station 330 may decide to switch the communication mode between the transmitter 310 and the receiver 320 from the cellular communication mode to the device-to-device communication mode. In this case, in order to meet the stringent requirement in the packet error loss rate during the process of switching the communication mode between the transmitter 310 and the receiver 320, the transmitter 310, the receiver 320 and the base station 330 may correspondingly perform a method for switching the communication connection modes depicted in FIG. 4 to achieve such effect.

Figure 4:
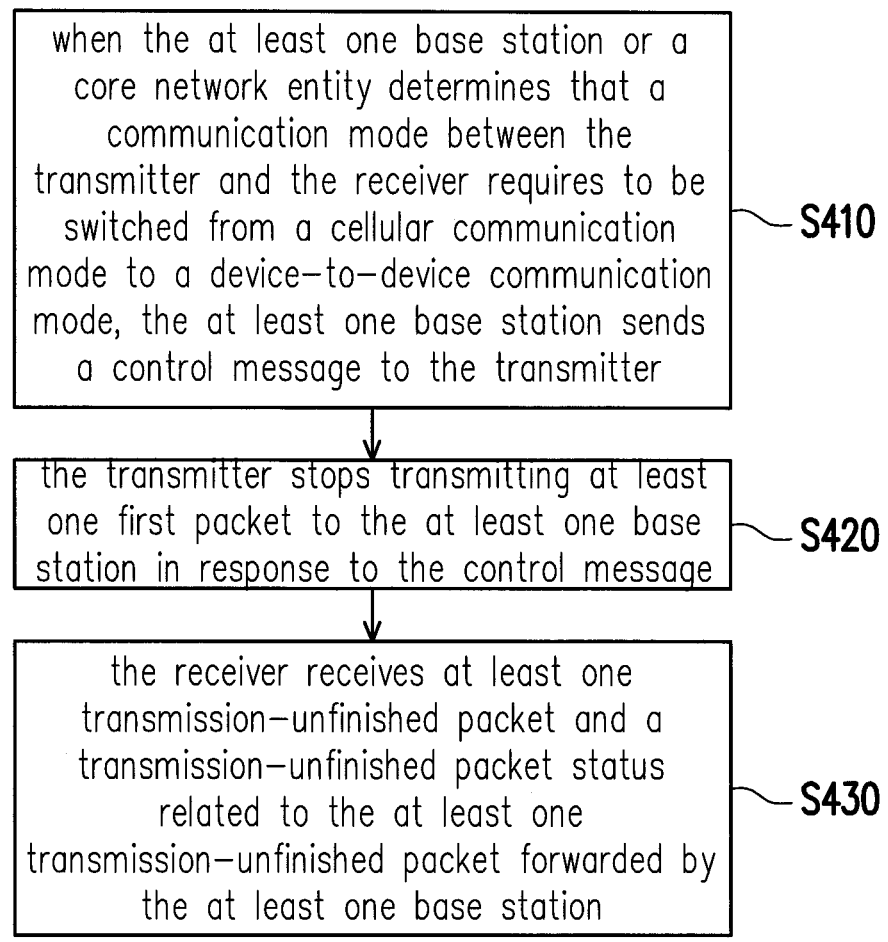
FIG. 4 is a flowchart illustrating a method for switching communication connection modes according to an embodiment of the present disclosure.

FIG. 4 is a flowchart illustrating a method for switching communication connection modes according to an embodiment of the present disclosure. Steps in the method proposed by the present embodiment may be implemented by each element depicted in FIG. 3A, and each of the steps of the present embodiment is described in detail with reference to FIG. 3A.

In step S410, when the base station 330 or a core network entity determines that the communication mode between the transmitter 310 and the receiver 320 requires to be switched from the cellular communication mode to the device-to-device communication mode, the base station 330 may send a control message to the transmitter 310. The control message is, for example, a radio resource control (RRC) message, but the embodiment of the present disclosure is not limited thereto. The core network entity is, for example, any network entities capable of detecting the condition of the device-to-device communication channels between the transmitter 310 and the receiver 320 so as to determine whether it is possible to switch the communication mode between the transmitter 310 and the receiver 320 from the cellular communication mode to the device-to-device communication mode. However, the embodiment of the present disclosure is not limited thereto. Next, in the present embodiment, the base station 330 may forward a transmission-unfinished packet and a transmission-unfinished packet status related to the transmission-unfinished packet to the receiver 320.

Next, in step S420, the transmitter 310 may stop transmitting a first packet (e.g., the packets P10 and P11) to the base station 330 in response to the control message. More specifically, the first packet may be regarded as the packet which is not transmitted, by the transmitter, to the base station 330. From another prospective, the control message sent by the base station 330 may be referred to as a message for controlling the transmitter 310 to stop transmitting the first packet.

Afterwards, in step S430, the receiver 320 may receive the transmission-unfinished packet and the transmission-unfinished packet status related to the transmission-unfinished packet forwarded by the base station 330. The transmission-unfinished packet is, for example, the packets P7 to P9 which are not transmitted by the base station 330 to the core network 340 via the EPS radio bearer ERB 1. In addition, the transmission-unfinished packet status related to the transmission-unfinished packet is, for example, the PDCP sequence numbers of the transmission-unfinished packets (i.e., SN7 to SN9).

In other words, after the base station 330 has switched the communication mode between the transmitter 310 and the receiver 320 to the device-to-device communication mode, the base station 330 may send the temporarily stored packets P7 to P9 and the PDCP sequence numbers related to the packets P7 to P9 (i.e., SN7 to SN9) to the receiver 320. In an embodiment, the base station 330 may send the PDCP sequence number of the transmission-unfinished packet through the control message (e.g., the RRC message) to the receiver 320. However, the embodiment of the present disclosure is not limited thereto.

Furthermore, in other embodiments, the receiver 320 may set a PDCP sequence number receiving status of the PDCP entity 321 of the receiver 320 according to the transmission-unfinished packet status (e.g., the PDCP sequence number). More specifically, the receiver 320 may set the PDCP sequence number receiving status of the PDCP entity 321 thereof as the same to that of the PDCP sequence number of the transmission-unfinished packet transmitted by the base station 330. Next, the receiver 320 may reset the RLC entity 322 thereof, so as to recover the RLC entity 322 back to a preset status. Afterwards, the receiver 320 may return a confirmation message to the base station 330, so as to inform the base station 330 that the receiver 320 is ready for executing the device-to-device communication with the transmitter 310.

After receiving the confirmation message from the receiver 320, the base station 330 knows that it is not required to be used as a medium for transmitting the packets between the transmitter 310 and the receiver 320. Therefore, the PDCP entity 331 corresponding to the transmitter 310 and the PDCP entity 333 corresponding to the receiver 320 may be reset, by the base station 330, in response to the confirmation message, so as to recover the PDCP entities 331 and 333 back to the preset status. In addition, the base station 330 may further allocate a communication resource for executing the device-to-device communication mode to the transmitter 310 and the receiver 320.

Figure 3B:
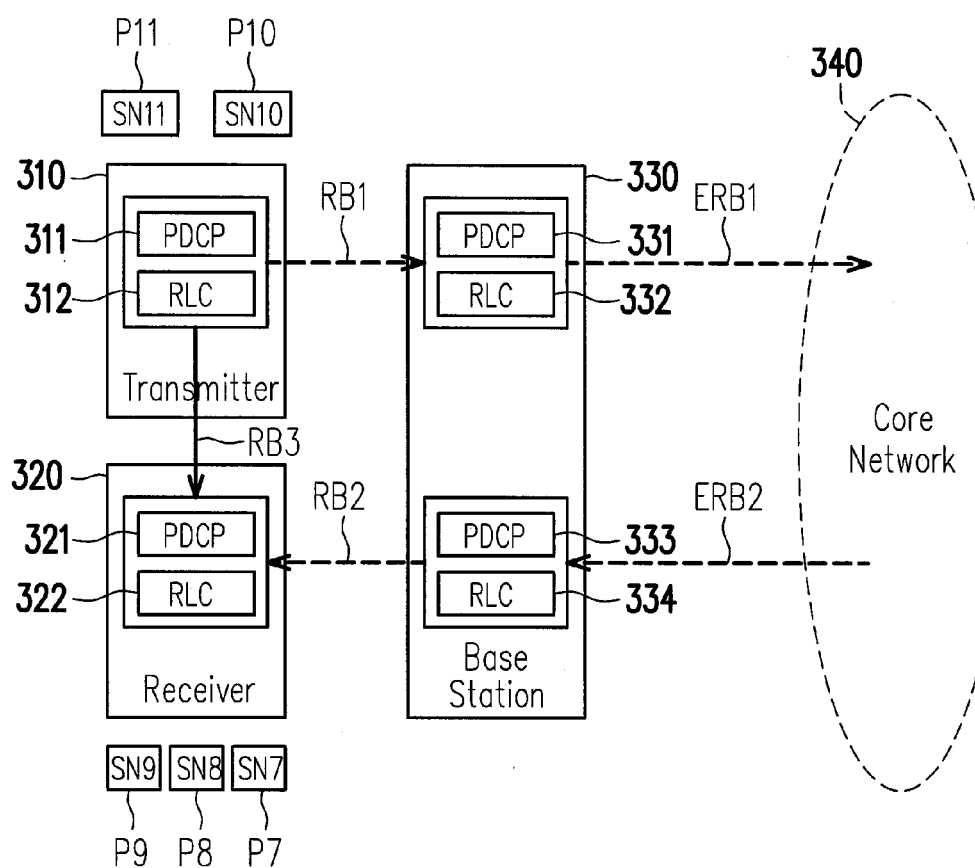
FIG. 3B illustrates a schematic diagram of a device-to-device communication according to FIG. 3A.

Referring to FIG. 3B, FIG. 3B illustrates a schematic diagram of a device-to-device communication according to FIG. 3A. In the present embodiment, the transmitter 310 may transmit the packets to the receiver 320 via a radio bearer RB3. It should be noted that, the bearers temporarily not being used for transmitting the packets are represented by dash lines in the present embodiment. As shown in FIG. 3B, the receiver 320 has received the packets P7 to P9 and the corresponding PDCP sequence numbers (i.e., SN7 to SN9) which are previously forwarded by the base station 330.

Accordingly, when the transmitter 310 and the receiver 320 are communicated in the device-to-device communication mode, since the receiver 320 and the transmitter 310 have the same cognition for the received packets (e.g., the packets P7 to P9), the transmitter 310 may transmit subsequent packets unmistakably. More specifically, after the base station 330 has forwarded the packets P7 to P9 and the corresponding PDCP sequence numbers (i.e., SN7 to SN9) to the receiver 320, since the corresponding PDCP sequence number of the last packet P9 received by the receiver 320 is SN9, the receiver 320 may inform the transmitter 310 to continue transmit the packet having the PDCP sequence number following SN9 (i.e., SN10). After notification from the receiver 320 is received by the transmitter 310, the transmitter 310 may then transmit the packet P10 corresponding to SN10.

From another prospective, the status of the PDCP entity 331 corresponding to the PDCP entity 311 may be referred to as being directly copied by the base station 330 to the PDCP entity 321 of the receiver 320, thus it is guaranteed that the transmitter 310 and the receiver 320 have the same cognition for the PDCP sequence numbers in the subsequent processes of executing the device-to-device communication. Therefore, the method proposed according to the present embodiment is capable of effectively reducing the packet error loss rate.

Otherwise, if said forwarding operation for the PDCP sequence number of the transmission-unfinished packet is not performed by the base station 330, errors may occur due to the transmitter 310 and the receiver 320 having different cognitions for the PDCP sequence number of each packet while executing the device-to-device communication. Furthermore, generally, the PDCP sequence number are non-global, thus the sequence numbers may only be adapted to, for example, a transmission between the transmitter 310 and the base station 330, or a transmission between the base station 330 and the receiver 320. In this case, if the receiver 320 requests the transmitter 310 to transmit the corresponding packets by directly using the non-global sequence number, wrong packets (which are not requested by the receiver 320) may be sent by the transmitter 310, such that the receiver 320 may receive the wrong packets.

It should be noted that, in other embodiments, when the communication mode between the transmitter 310 and the receiver 320 is switched to the device-to-device communication mode, if there are still packets routing in the core network 340, said packets may be lost resulting in increases of the packet error loss rate. Accordingly, the disclosure further proposes a method for switching communication connection modes which is capable of solving above-mentioned problem to further reduce the packet error loss rate.

Figure 5:
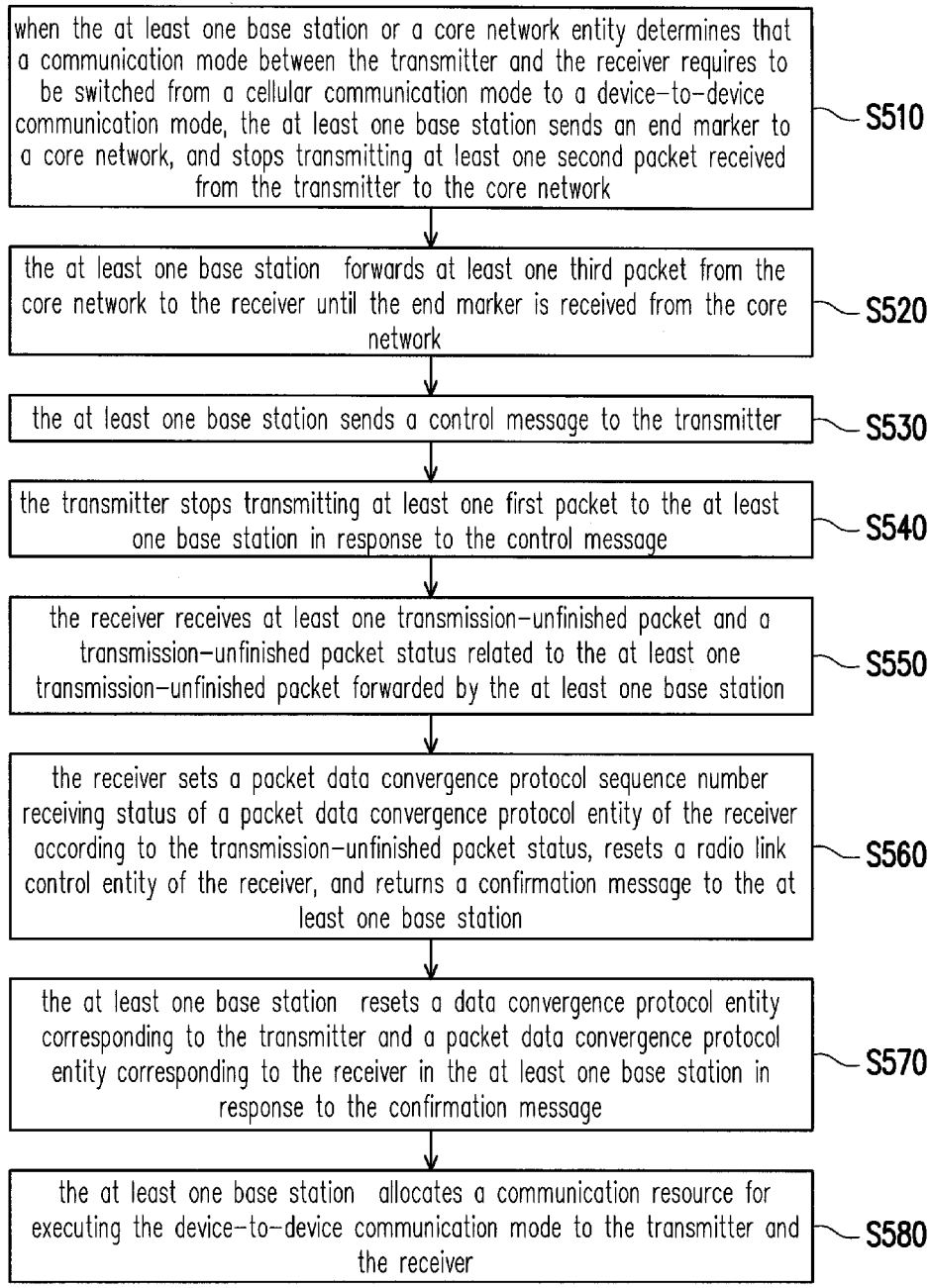
FIG. 5 is a flowchart illustrating the method for switching communication connection modes according to FIG. 4.

FIG. 5 is a flowchart illustrating the method for switching communication connection modes according to FIG. 4. FIG. 6A to FIG. 6F are schematic diagrams of switching from the cellular communication mode to the device-to-device communication mode according to an embodiment of the present disclosure.

Figure 6A:
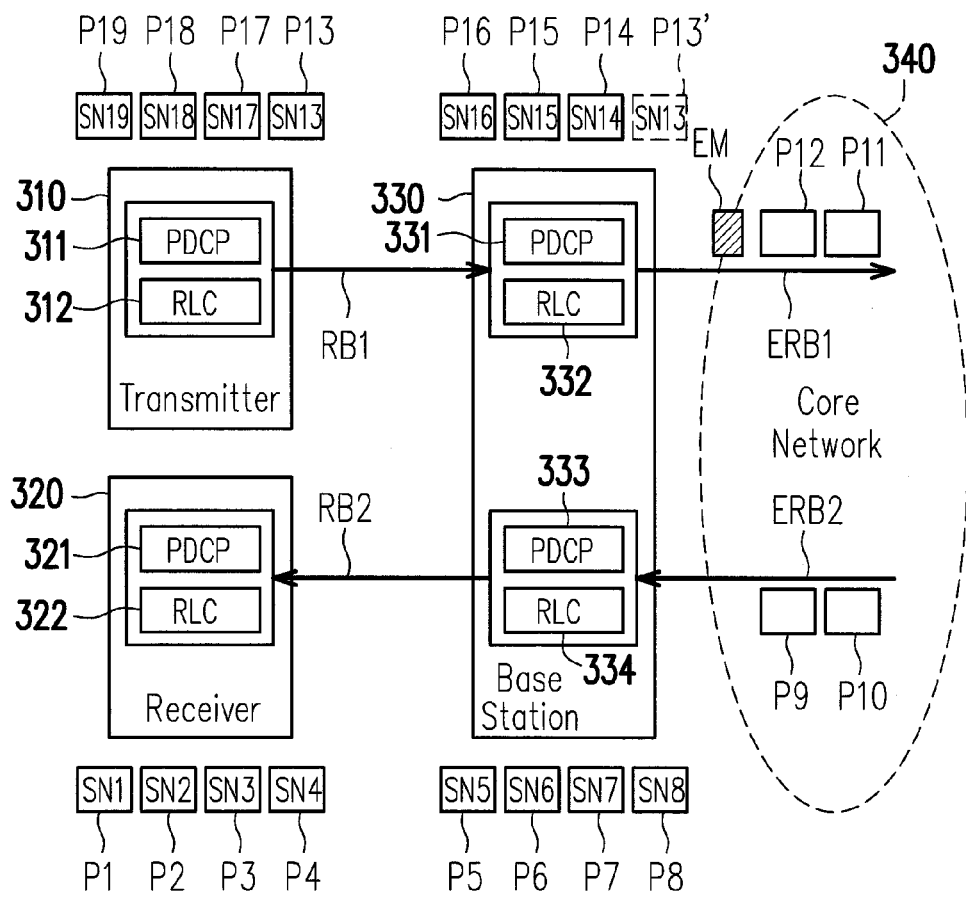
FIG. 6A to FIG. 6F are schematic diagrams of switching from the cellular communication mode to the device-to-device communication mode according to an embodiment of the present disclosure.

Referring to FIG. 6A, the present embodiment includes assumed scenarios as follows. The packets P1 to P4 have been successfully transmitted to the receiver 320; the core network 340 has routed the packets P5 to P8 to the base station 330, but the base station 330 has not transmit the packets P5 to P8 to the receiver 320; the packets P9 to P12 are still routing in the core network 340; the base station 330 has not receive the packet P13 due to some specific reasons (therefore, a packet P13' in a dash-line box at the base station 330 is used to indicate that the packet P13 is not received by the base station 330); the base station 330 has received the packets P14 to P16, and the packets P14 to P16 cannot be transmitted to the core network 340 in the manner of in-sequence because the packet P13 is not received; since the packet P13 is not successfully transmitted to the base station 330, the packet P13 is not deleted by the transmitter 310 and kept for retransmitting operation later; and the transmitter 310 has not transmit the packets P17 to P19 to the base station 330. It should be noted that since the packets P9 to P12 have been delivered to the core network 340, the PDCP sequence numbers thereof would be removed.

Referring to both of FIG. 5 and FIG. 6A, in step S510, when the base station 330 or a core network entity determines that the communication mode between the transmitter 310 and the receiver 320 requires to be switched from the cellular communication mode to the device-to-device communication mode, the base station 330 may send an end marker EM to the core network 340, and stop transmitting the packets P14 to P16 received from the transmitter 310 to the core network 340. It should be noted that, in other embodiments, even if the base station 330 has successfully received the packet P13 to recover the packets P13 to P16 back to in-sequence, the base station 330 may still stop transmitting the packet P13 to the core network 340 after sending the end marker EM. The end marker is, for example, a packet in a special form or other specific signals, representing that the transmitter 310 has stopped transmitting the packet to the core network 340.

Figure 6B:
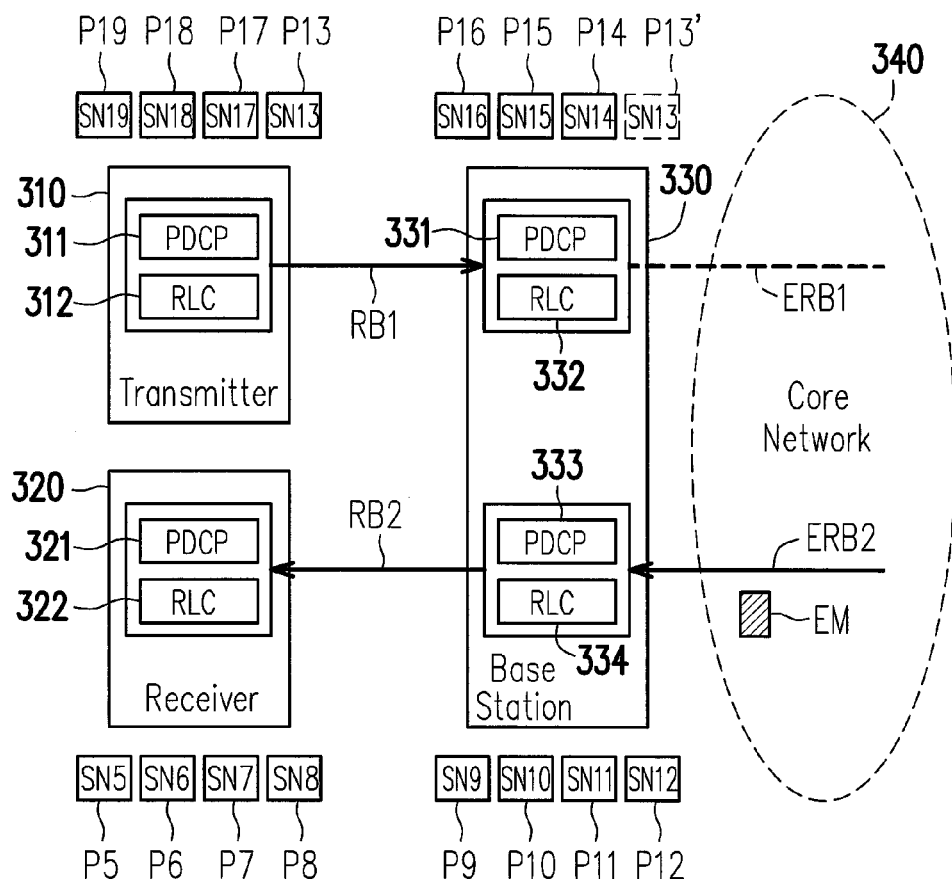
Figure 6C:
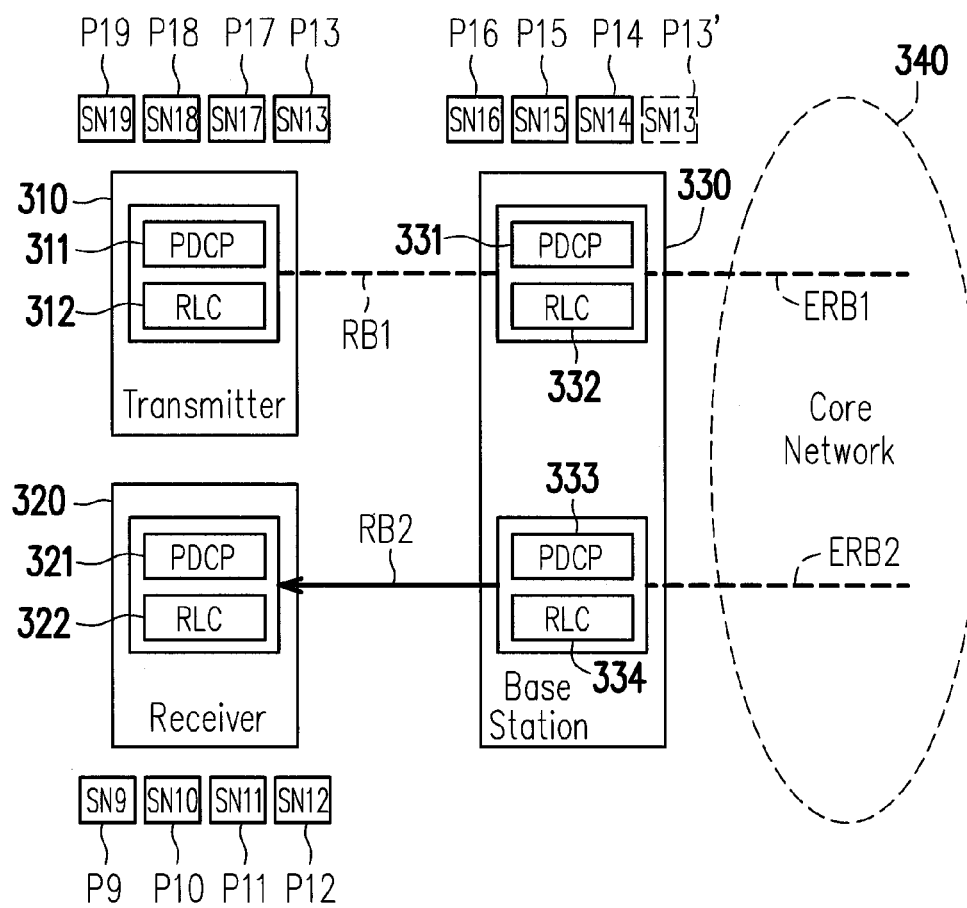

Next, referring to both of FIG. 5 and FIG. 6B, in step S520, the base station 330 may forward the packets P5 to P12 from the core network 340 to the receiver 320 until the end marker EM is received from the core network 340. More specifically, when the end marker EM is received by the base station 330 from the core network 340, the base station 330 may be informed that the packets not being routed to the base station 330 are no longer existed in the core network 340 at the time. In other words, by using mechanism of configuring the end marker EM, it is guaranteed that the packets which are still routing in the core network 340 cannot be lost when switching the communication mode between the transmitter 310 and the receiver 320 from the cellular communication mode to the device-to-device communication mode, so as to further reduce the packet error loss rate. Referring to FIG. 6C, which is, for example, a schematic diagram of the base station 330 after transmitting of the packets P5 to P12.

Figure 6D:
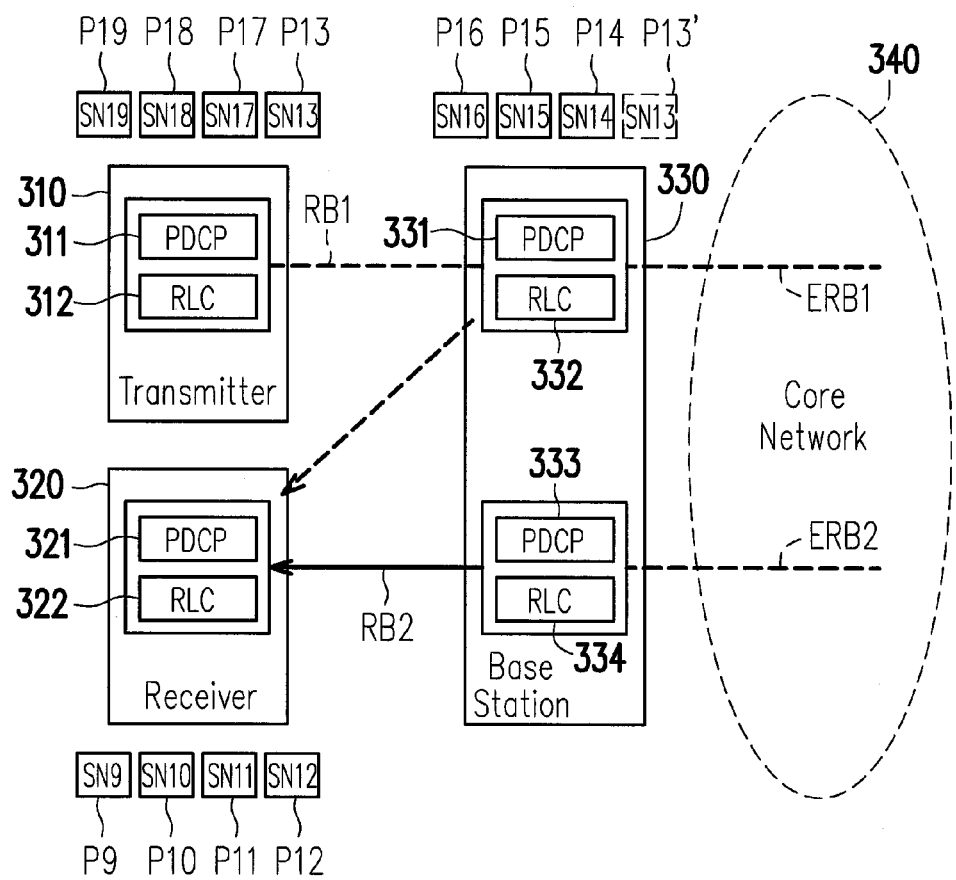

Referring to both of FIG. 5 and FIG. 6D, in step S530, the base station 330 may send the control message (e.g., the RRC message) to the transmitter 310. In other embodiments, the base station 330 may also perform step S530 before proceeding to steps S510 and S520, or the base station 330 may also perform steps S510 to S530 at the same time.

Next, in step S540, the transmitter 310 may stop transmitting the packets to the base station 330 in response to the control message. In other embodiments, the transmitter 310 may further reset the RLC entity 312 after receiving the control message.

In step S550, the receiver 320 may receive the transmission-unfinished packet (e.g., the packets P14 to P16) and the transmission-unfinished packet status (e.g., the PDCP sequence number of each of the packets P14 to P16 (i.e., SN14 to SN16)) related to the transmission-unfinished packet forwarded by the base station 330.

It should be noted that, even if the packet P13 is not received by the base station 330, the base station 330 may still forward its status to the receiver 320 so as to inform the receiver 320 of its current condition. For instance, in an embodiment, the base station 330 may inform the receiver 320 about the PDCP sequence numbers (e.g., SN13) of the packets that should be received but not received (e.g., the packet P13). Accordingly, the receiver 320 may then request the transmitter 310 to retransmit the packet P13 later when executing the device-to-device communication with the transmitter 310.

Figure 6E:
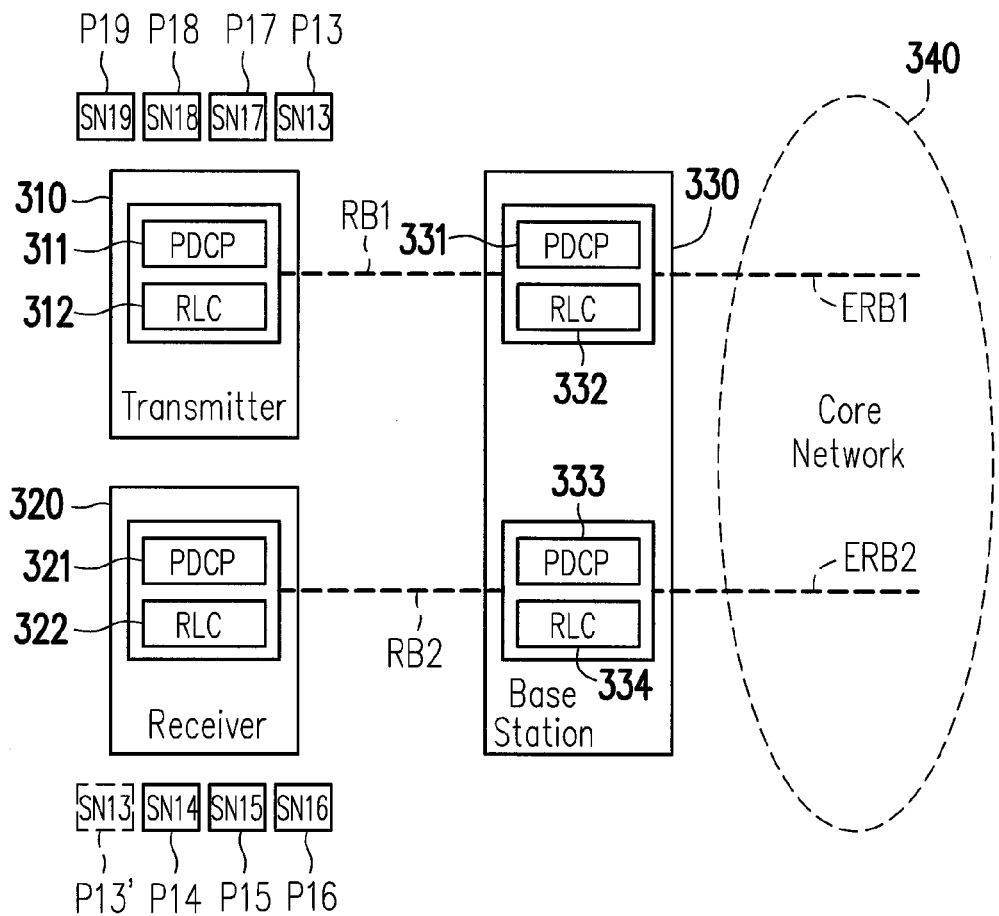

In the present embodiment, since the base station 330 is used as the base station for serving both the transmitter 310 and the receiver 320, the base station 330 may transmit the transmission-unfinished packet (e.g., the packets P14 to P16) via the radio bearer RB2. Moreover, in other embodiments, the base station 330 may also transmit the transmission-unfinished packet (e.g., the packets P14 to P16) and the transmission-unfinished packet status (e.g., SN13 to SN16) related to the transmission-unfinished packet through the RRC message to the receiver 320. However, the embodiment of the present disclosure is not limited thereto. Other details regarding steps S530 to S550 may refer to steps S410 to S430 in FIG. 4, thus related description is omitted hereinafter. Referring to FIG. 6E, which is, for example, a schematic diagram of the base station 330 after transmitting of the packets P14 to P16 and SN13 to SN16.

Figure 6F:
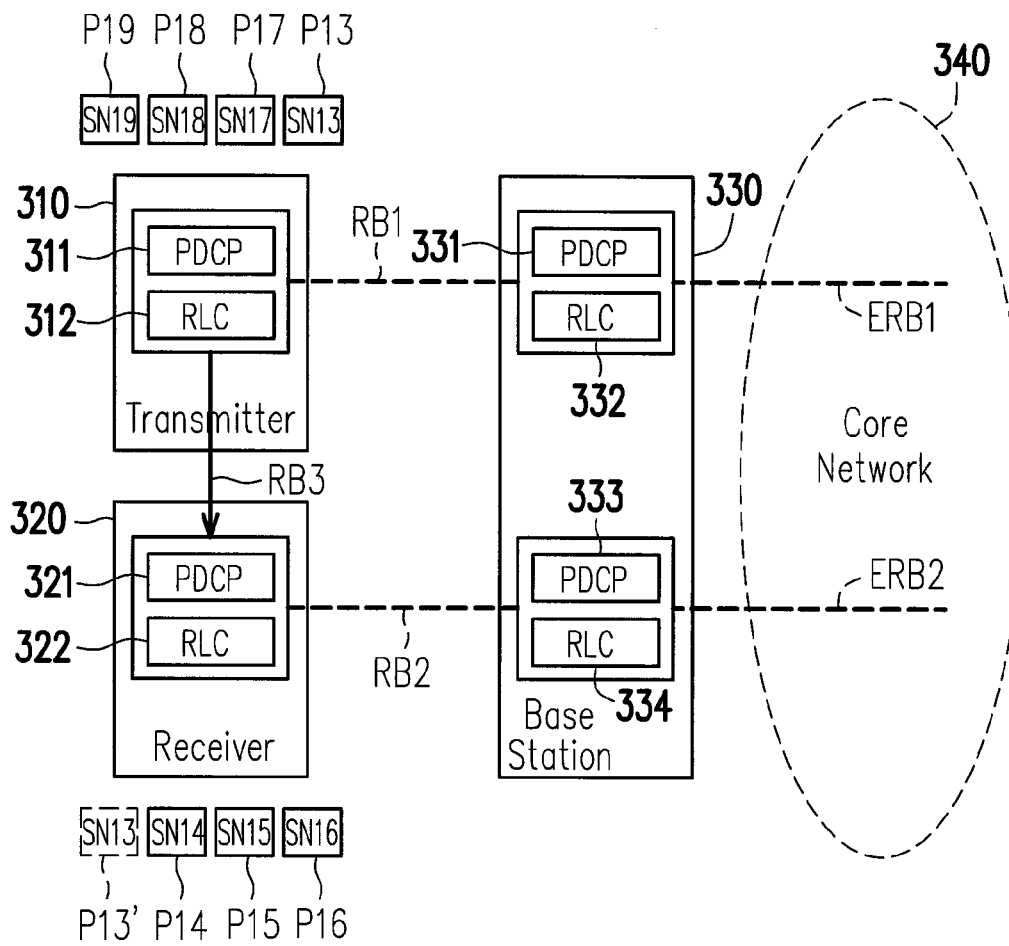

Referring back to FIG. 5, in step S560, the receiver 320 may set the PDCP sequence number receiving status of the PDCP entity 321 of the receiver 320 according to the transmission-unfinished packet status, reset the RLC entity 322 of the receiver 320, and return the confirmation message to the base station 330. In step S570, the base station 330 may reset the PDCP entity 331 corresponding to the transmitter 310 and the PDCP entity 333 corresponding to the receiver 320 in the base station 330 in response to the confirmation message. In step S580, the base station 330 may allocate a communication resource for executing the device-to-device communication mode to the transmitter 310 and the receiver 320. Referring to FIG. 6F, which is, for example, a schematic diagram of the device-to-device communication executed between the transmitter 310 and the receiver 320 according to the communication resource allocated by the base station 330.

In brief, by using the method as proposed in the embodiment of FIG. 5, when the communication mode between the transmitter 310 and the receiver 320 is switched from the cellular communication mode to the device-to-device communication mode, in addition to the transmitter 310 and the receiver 320 having the same cognition for the PDCP sequence number corresponding to each packet, loss of the packets still routing in the core network may also be avoided, so as to achieve a relatively lower packet error loss rate.

It should be noted that, although the base station serving both the transmitter 310 and the receiver 320 in the foregoing embodiments is the base station 330, in other embodiments, the method proposed by the present disclosure is also adapted to a situation where the transmitter 310 and the receiver 320 are served by different base stations.

Figure 7:
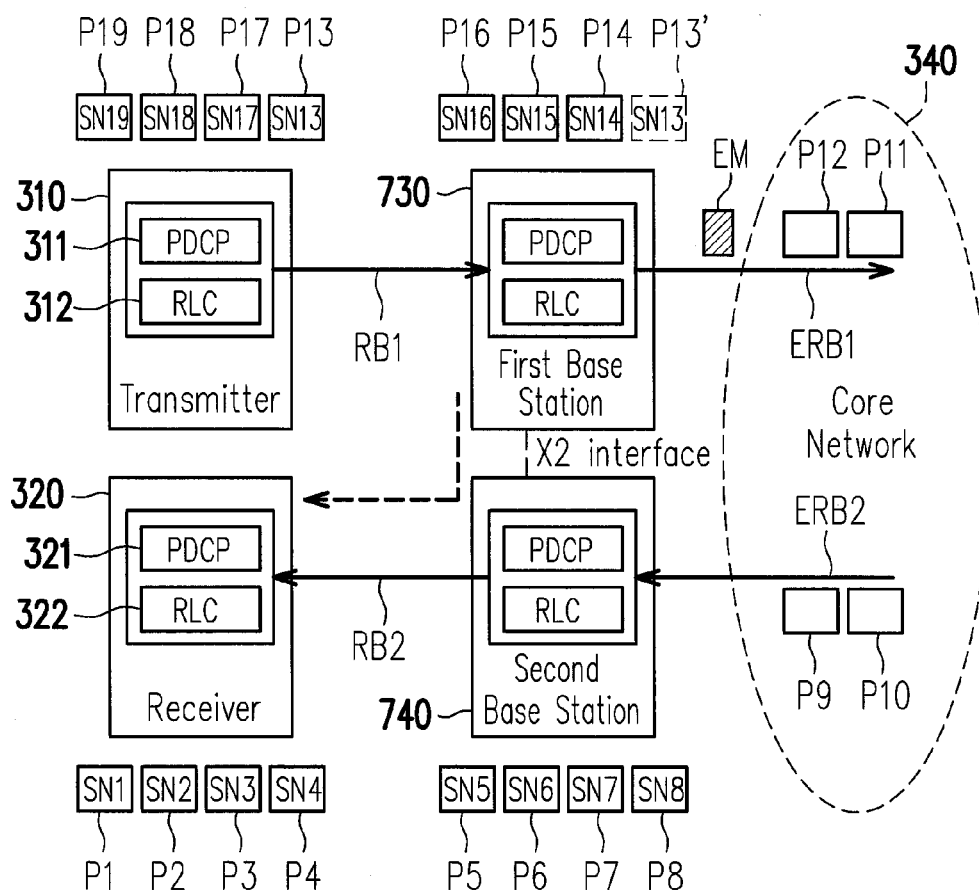
FIG. 7 is a schematic diagram of switching from the cellular communication mode to the device-to-device communication mode according to an embodiment of the present disclosure.

Referring to FIG. 7, FIG. 7 is a schematic diagram of switching from the cellular communication mode to the device-to-device communication mode according to an embodiment of the present disclosure. In the present embodiment, it is assumed that the transmitter 310 and the receiver 320 are served by a first base station 730 and a second base station 740 respectively, and the first base station 730 and the second base station 740 are communicated to each other via an X2 interface defined in the LTE.

As shown in FIG. 7, when the communication mode between the transmitter 310 and the receiver 320 is switched from the cellular communication mode to the device-to-device communication mode, the first base station 730 may forward the transmission-unfinished packet (e.g., the packets P14 to P16) and the corresponding transmission-unfinished packet status (e.g., SN13 to SN16) to the receiver 320 via the X2 interface and the second base station 740, sequentially.

From another prospective, since the receiver 320 is not served by the first base station 730 in FIG. 7, the transmission-unfinished packet (e.g., the packets P14 to P16) and the corresponding transmission-unfinished packet status (e.g., SN13 to SN16) cannot be directly forwarded to the receiver 320, instead, the X2 interface and the second base station 740 are required to complete said forwarding operation. In addition to said difference, other technical details are similar to each of the embodiments described above, thus related description is omitted hereinafter.

It should be understood that, despite that the foregoing embodiments illustrate the situation where the cellular communication mode is switched to the device-to-device communication mode, in other embodiments, when the communication mode between the transmitter 310 and the receiver 320 is switched from the device-to-device communication mode to the cellular communication mode, the transmitter 310 and/or the receiver 320 may also perform the forwarding operation for the transmission-unfinished packet and the corresponding transmission-unfinished packet status as similar to that in the foregoing embodiments, so as to reduce the packet error loss rate when switching between the communication modes. Detailed description will be described hereinafter.

Figure 8:
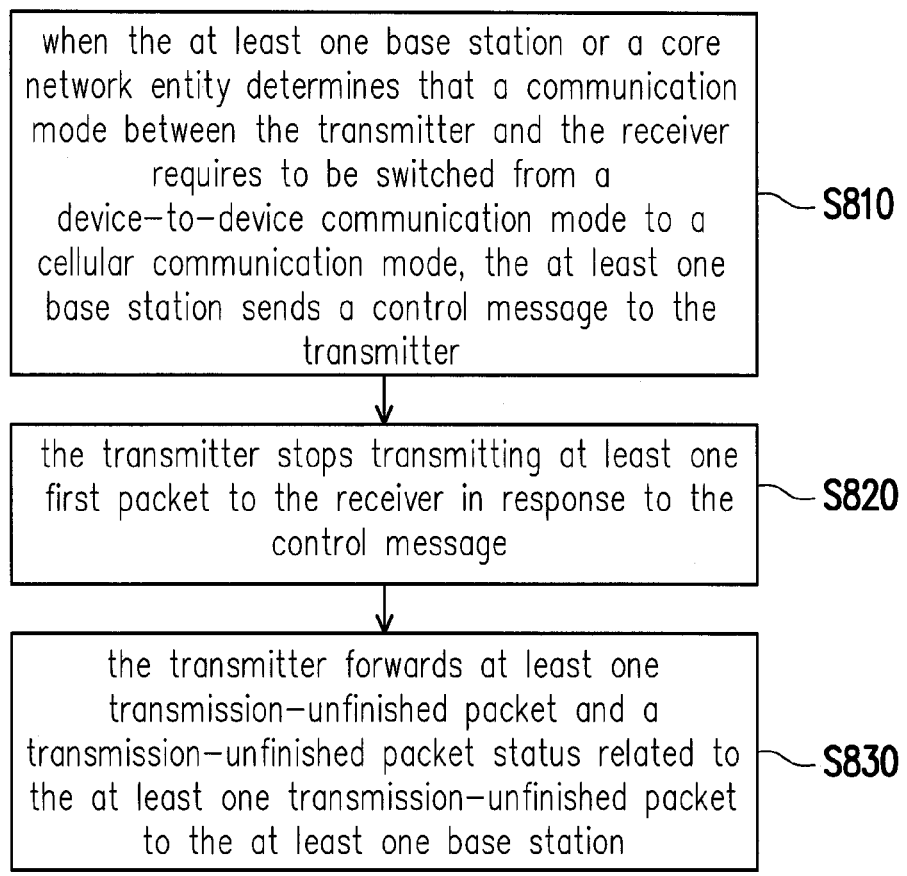
FIG. 8 is a flowchart illustrating a method for switching communication connection modes according to an embodiment of the present disclosure.
Figure 9A:
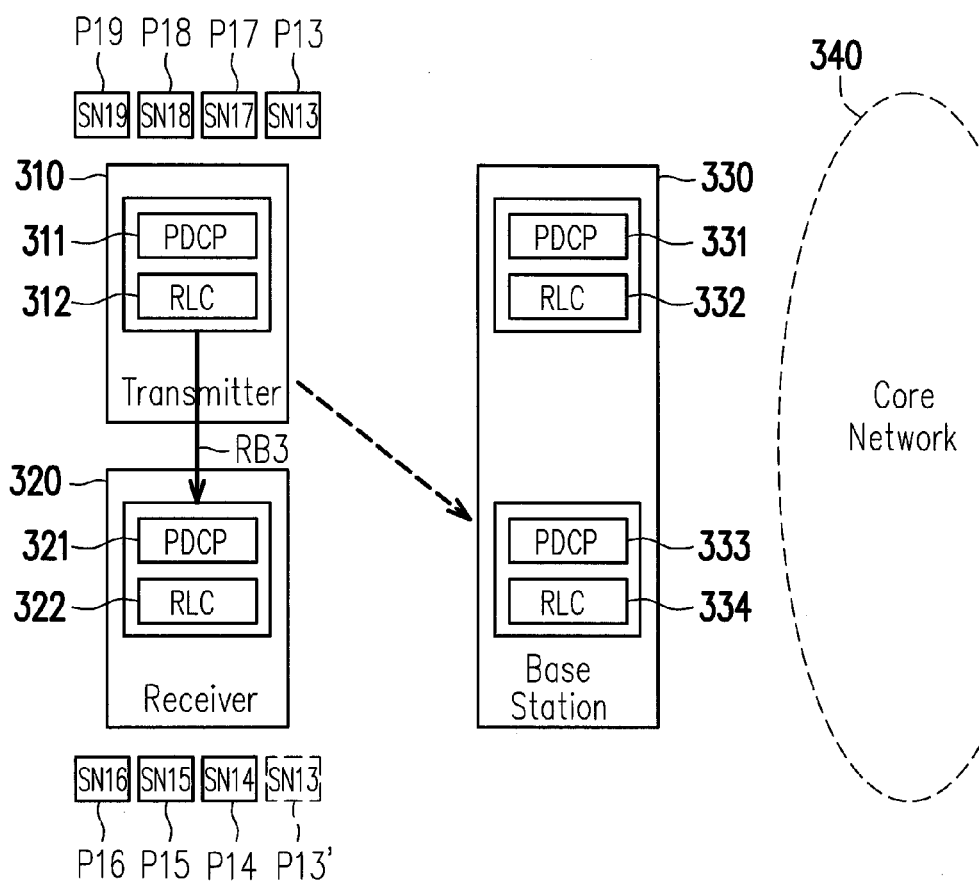
FIG. 9A to FIG. 9B are schematic diagrams of switching from the device-to-device communication mode to the cellular communication mode according to an embodiment of the present disclosure.
Figure 9B:
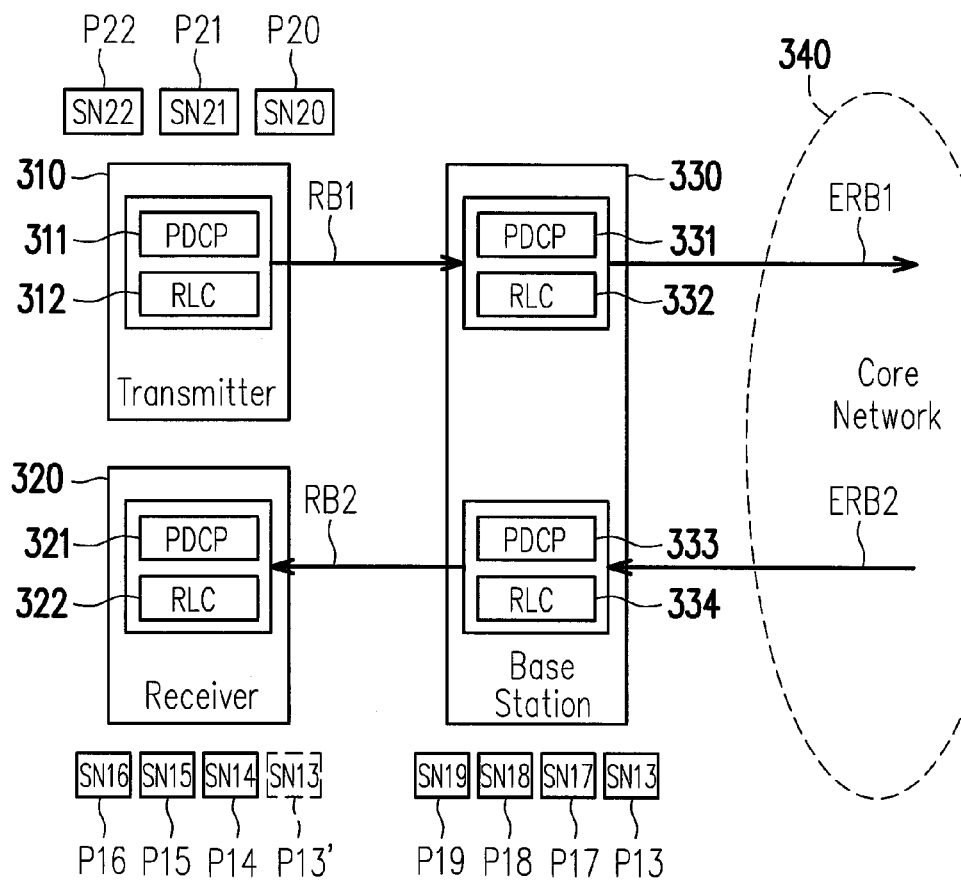

FIG. 8 is a flowchart illustrating a method for switching communication connection modes according to an embodiment of the present disclosure. FIG. 9A to FIG. 9B are schematic diagrams of switching from the device-to-device communication mode to the cellular communication mode according to an embodiment of the present disclosure.

Referring to FIG. 9A, the present embodiment includes assumed scenarios as follows. The packets P14 to P16 have been successfully transmitted to the receiver 320 via a radio bearer RB3; the receiver 320 has not receive the packet P13 due to some specific reasons (therefore, a packet P13' in a dash-line box at the receiver 320 is used to indicate that the packet P13 is not yet received by the receiver 320); since the packet P13 is not successfully transmitted to the base station 330, the packet P13 is not deleted by the transmitter 310 and kept for retransmitting operation later; and the transmitter 310 has not transmit the packets P17 to P19 to the receiver 320.

Referring to both of FIG. 8 and FIG. 9A, in step S810, when the base station 330 or a core network entity determines that the communication mode between the transmitter 310 and the receiver 320 requires to be switched from the device-to-device communication mode to the cellular communication mode, the base station 330 may send a control message to the transmitter 310. In the present embodiment, the base station 330 may control the transmitter 310 to stop transmitting at least one first packet to the receiver 320 through the control message.

Next, in step S820, the transmitter 310 stops transmitting the at least one first packet to the receiver 320 in response to the control message. The at least one first packet is, for example, the packets P13 and P17 to P19.

Afterwards, in step S830, the transmitter 310 forwards at least one transmission-unfinished packet and a transmission-unfinished packet status related to the at least one transmission-unfinished packet to the base station 330. More specifically, the transmitter 310 may forward the packets P13 and P17 to P19 and the corresponding PDCP sequence numbers (i.e., SN13 and SN17 to SN19). Afterwards, the base station 330 may receive the transmission-unfinished packet and the transmission-unfinished packet status related to the transmission-unfinished packet forwarded by the transmitter 310.

In an embodiment, the base station 330 may set a PDCP sequence number transmitting status of the PDCP entity 333 corresponding to the receiver 320 in the base station 330 according to the transmission-unfinished packet status (e.g., SN13 and SN17 to SN19). In addition, the base station 330 may further allocate a communication resource for executing the cellular communication mode to the transmitter 310 and the receiver 320.

Referring to FIG. 9B, FIG. 9B is, for example, a schematic diagram for setting the PDCP receiving status of the PDCP entity 333 by the base station 330 according to the packets P13 and P17 to P19 and the corresponding PDCP sequence numbers (i.e., SN 13 and SN 17 to SN 19) which are already received.

In the present embodiment, after establishing the radio bearer RB 1 with the base station 330, the transmitter 310 may transmit the packets to be sent to the receiver 320 (e.g., the packets P20 to P22), to the base station 330. Next, the base station 330 may transmit the packets from the transmitter 310 to the core network 340 via the EPS radio bearer ERB 1, for routing the packets to the receiver 320. Since it is assumed that the base station 330 serves both the transmitter 310 and the receiver 320 at the same time in FIG. 9B, the core network 340 may transmit the packets from the transmitter 310 to the base station 330 via the EPS radio bearer ERB2. Afterwards, the base station 330 may forward the packets received from the core network 340 to the receiver 320 via the radio bearer RB2.

It should be noted that, since it is required for the base station 330 to forward the packets to the receiver 320 in the manner of in-sequence, the base station 330 may sequentially forward the packets P13 and P17 to P19 to the receiver 320 before forwarding the packets subsequently received from the core network 340.

By using a forwarding operation for the transmission-unfinished packet and the transmission-unfinished packet status as similar to that performed in the embodiment of FIG. 4, when the communication mode between the transmitter 310 and the receiver 320 is switched from the device-to-device communication mode to the cellular communication mode, the method proposed in the embodiment of FIG. 8 is capable of effectively avoiding loss of packets thereby reducing the packet error loss rate. From another prospective, the status of the PDCP entity 311 corresponding to the PDCP entity 321 may be referred to as being directly copied by the transmitter 310 to the PDCP entity 333 of the base station, thus it is guaranteed that the base station 330 and the receiver 320 have the same cognition for the PDCP sequence numbers in the subsequent processes of executing the cellular communication.

It should be noted that, although the base station serving the transmitter 310 and the receiver 320 is the base station 330 in the embodiments of FIG. 9A and FIG. 9B, in other embodiments, the method proposed by the present disclosure is also adapted to a situation where the transmitter 310 and the receiver 320 are served by different base stations.

Figure 10:
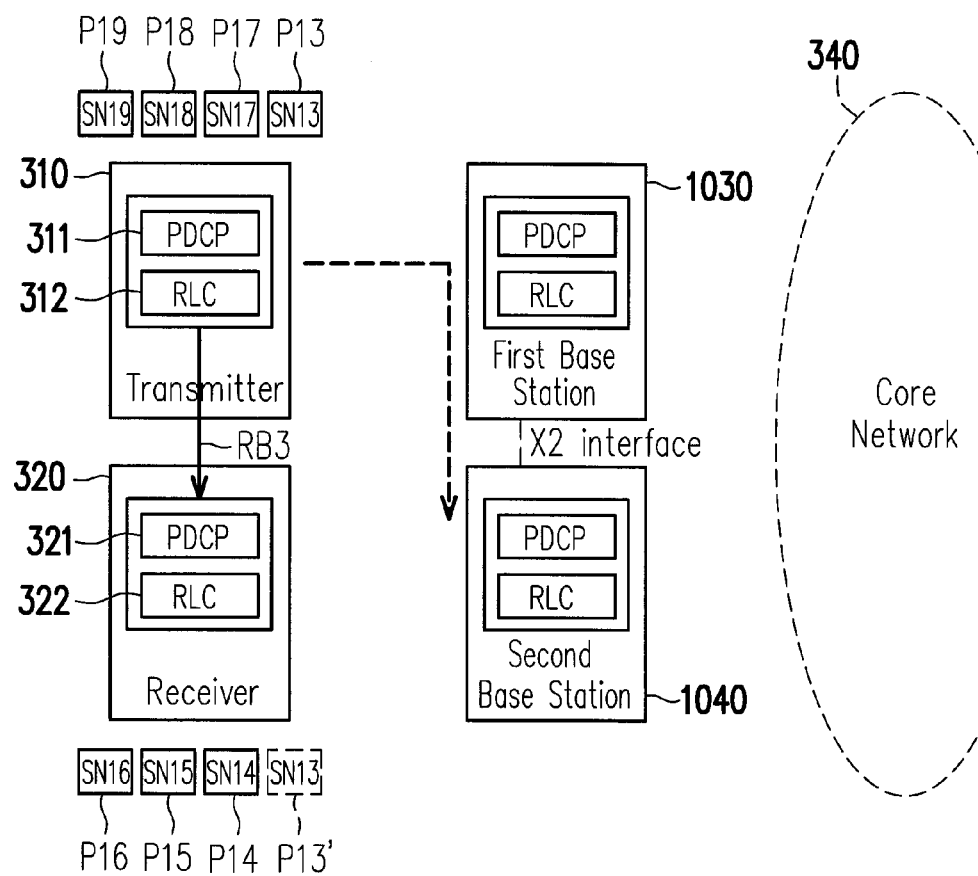
FIG. 10 is a schematic diagram of switching from the device-to-device communication mode to the cellular communication mode according to an embodiment of the present disclosure.

Referring to FIG. 10, FIG. 10 is a schematic diagram of switching from the device-to-device communication mode to the cellular communication mode according to an embodiment of the present disclosure. In the present embodiment, it is assumed that the transmitter 310 and the receiver 320 are served by a first base station 1030 and a second base station 1040 respectively, and the first base station 1030 and the second base station 1040 are communicated to each other via an X2 interface defined in the LTE.

As shown in FIG. 10, when the communication mode between the transmitter 310 and the receiver 320 is switched from the device-to-device communication mode to the cellular communication mode, the transmitter 310 may forward the transmission-unfinished packet (e.g., the packets P13 and P17 to P19) and the transmission-unfinished packet status (e.g., SN13 and SN17 to SN19) to the second base station 1040 via the first base station 1030.

After the packets P13 and P17 to P19 as well as SN13 and SN17 to SN19 are received by the second base station 1040, operations for executing the cellular communication may refer to related description in FIG. 9A and FIG. 9B, which is not repeated hereinafter.

Despite that FIG. 8, FIG. 9A and FIG. 9B illustrate the method in which the transmitter 310 forwards the transmission-unfinished packet and the transmission-unfinished packet status to the base station 330, in other embodiments, when the communication mode between the transmitter 310 and the receiver 320 is switched to the cellular communication mode, it may also be done using a method in which the receiver 320 forwards the transmission-unfinished packet and the transmission-unfinished packet status to the base station 330. The detailed description is given as follows.

Figure 11:
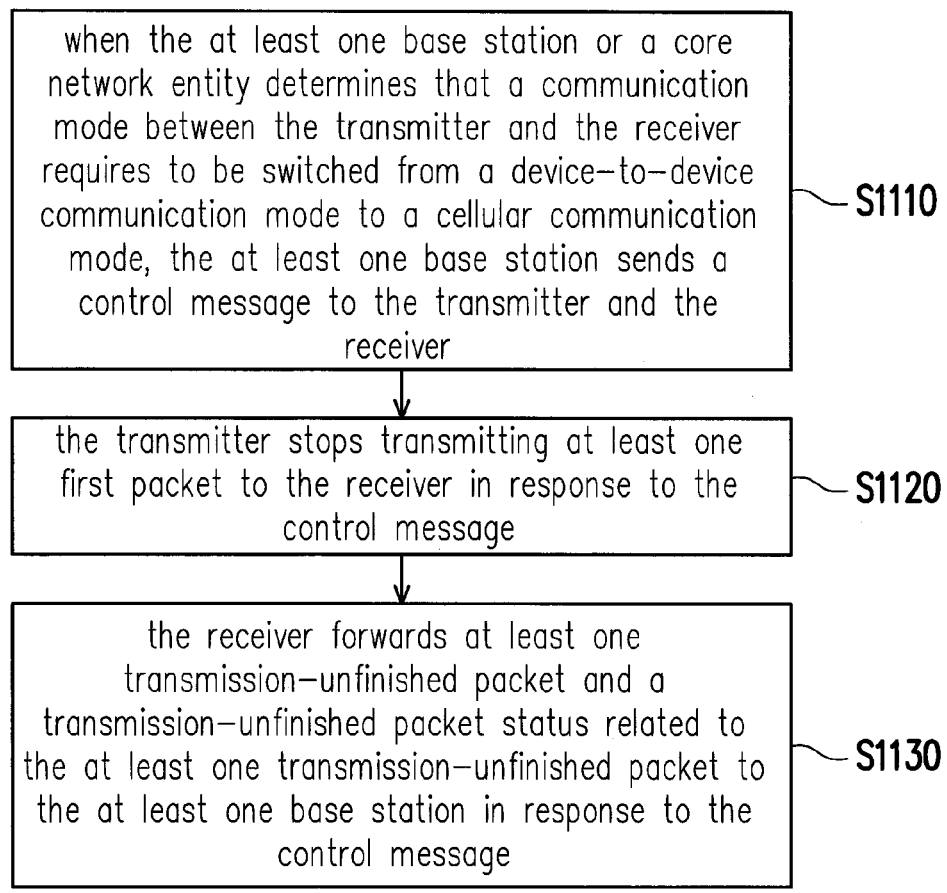
FIG. 11 is a flowchart illustrating a method for switching communication connection modes according to an embodiment of the present disclosure.
Figure 12A:
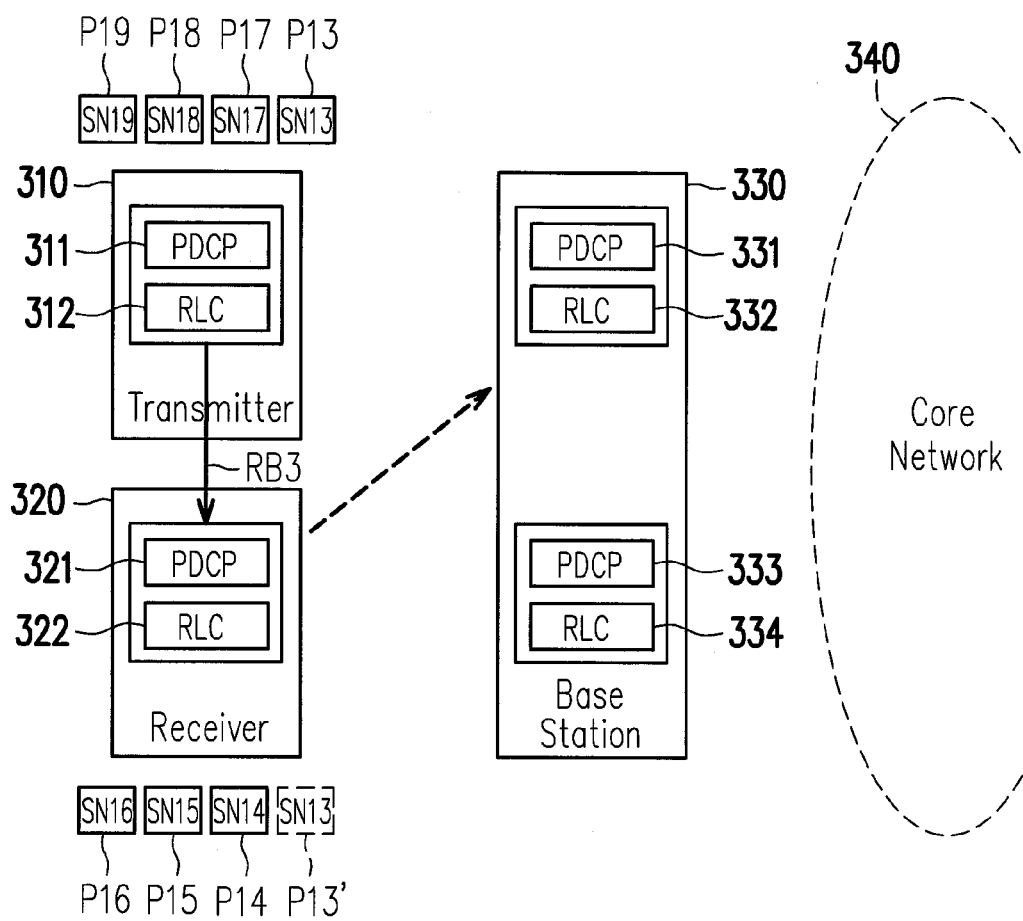
FIG. 12A to FIG. 12B are schematic diagrams of switching from the device-to-device communication mode to the cellular communication mode according to an embodiment of the present disclosure.
Figure 12B:
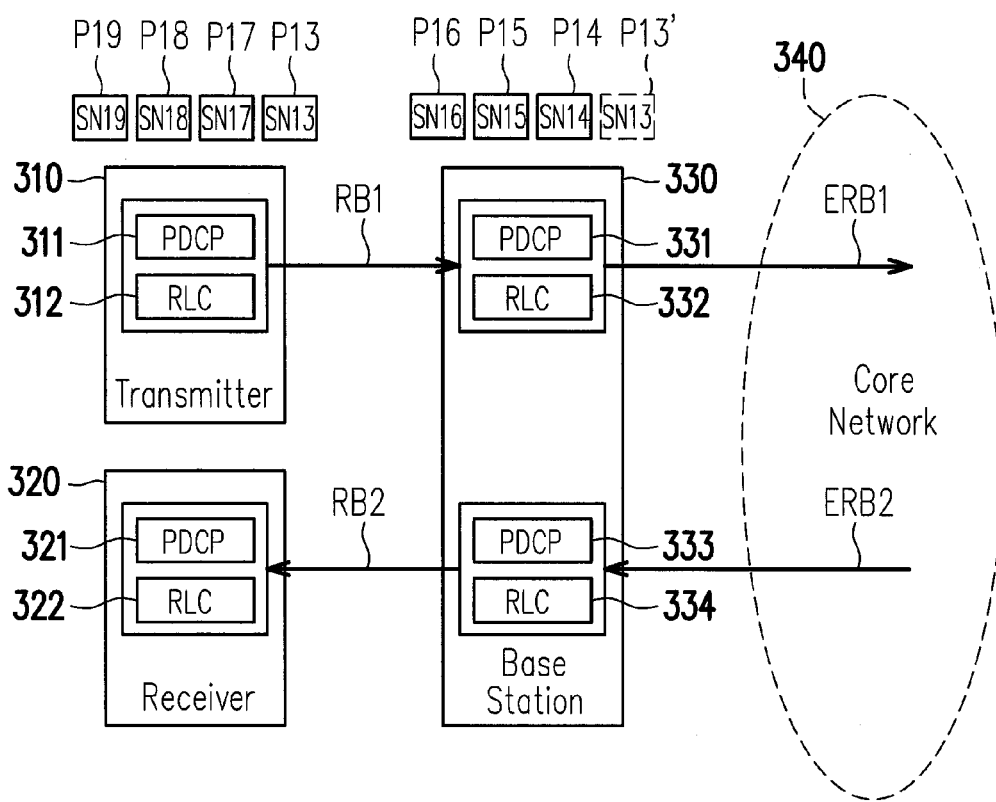

FIG. 11 is a flowchart illustrating a method for switching communication connection modes according to an embodiment of the present disclosure. FIG. 12A to FIG. 12B are schematic diagrams of switching from the device-to-device communication mode to the cellular communication mode according to an embodiment of the present disclosure.

Assumed scenarios in the embodiment of FIG. 12A are similar to that in FIG. 9A, thus related description is omitted hereinafter. Referring to both of FIG. 11 and FIG. 12A, in step S1110, when the base station 330 or a core network entity determines that the communication mode between the transmitter 310 and the receiver 320 requires to be switched from the device-to-device communication mode to the cellular communication mode, the base station 330 may send the control message to the transmitter 310 and the receiver 320. Next, in step S1120, the transmitter 310 stops transmitting the at least one first packet to the receiver 320 in response to the control message. The at least one first packet is, for example, the packets P13 and P17 to P19. Details regarding steps S1110 and S1120 may refer to steps S810 and S820, thus related description is omitted hereinafter.

Afterwards, in step S1130, the receiver 320 may forward at least one transmission-unfinished packet and a transmission-unfinished packet status related to the at least one transmission-unfinished packet to the base station 330 in response to the control message. More specifically, the receiver 320 may forward the packets P14 to P16 and the corresponding PDCP sequence numbers (i.e., SN14 to SN16). Meanwhile, since the packet P13 is not received by the receiver 320, the receiver 320 may also forward the PDCP sequence number (i.e., SN13) of the packet P13 to the base station 330.

In an embodiment, the base station 330 may set the PDCP sequence number receiving status of the PDCP entity 331 of the receiver 310 in the base station 330 according to the transmission-unfinished packet status (e.g., SN14 to SN16). In addition, the base station 330 may further allocate a communication resource for executing the cellular communication mode to the transmitter 310 and the receiver 320.

Referring to FIG. 12B, FIG. 12B is, for example, a schematic diagram for setting the PDCP receiving status of the PDCP entity 331 by the base station 330 according to the packets P14 to P16 and the corresponding PDCP sequence numbers (i.e., SN13 to SN16) which are already received.

In the present embodiment, the packets forwarded by the receiver 320 to the base station 330 are out-of-sequence (because the packet P13 is not received), and hence the base station 330 may wait until the packet P13 resent by the transmitter 310 is received, and then sends the packets P13 to P16 recovered back to in-sequence to the core network 340 via the EPS radio bearer ERB1. Next, the core network 340 may facilitate in routing the packets from the transmitter 310 to the receiver 320, and details thereof may refer to teachings in the foregoing embodiments, thus related description is omitted hereinafter.

By using a forwarding operation for the transmission-unfinished packet and the transmission-unfinished packet status as similar to that performed in the embodiments of FIG. 4 and FIG. 8, when the communication mode between the transmitter 310 and the receiver 320 is switched from the device-to-device communication mode to the cellular communication mode, the method proposed in the embodiment of FIG. 11 is capable of effectively avoiding loss of packets thereby reducing the packet error loss rate. From another prospective, the status of the PDCP entity 321 corresponding to the PDCP entity 311 may be referred to as being directly copied by the receiver 320 to the PDCP entity 331 of the base station, thus it is guaranteed that the base station 330 and the transmitter 310 have the same cognition for the PDCP sequence numbers in the subsequent processes of executing the cellular communication.

In brief, a difference between FIG. 8 and FIG. 11 is that: in FIG. 8, it is the transmitter 310 that forwards the transmission-unfinished packet and the transmission-unfinished packet status to the base station 330; whereas in FIG. 11, it is the receiver 320 that forwards the transmission-unfinished packet and the transmission-unfinished packet status to the base station 330. It should be understood that, while aforementioned difference is present between FIG. 8 and FIG. 11, the two methods are substantially of the method of forwarding the transmission-unfinished packet and the transmission-unfinished packet status to the base station, which is used to guarantee that the packet error loss rate is relatively lower when switching from the device-to-device communication mode to the cellular communication mode.

It should be noted that, although the base station serving the transmitter 310 and the receiver 320 is the base station 330 in the embodiments of FIG. 12A and FIG. 12B, in other embodiments, the method proposed by the present disclosure is also adapted to a situation where the transmitter 310 and the receiver 320 are served by different base stations.

Figure 13:
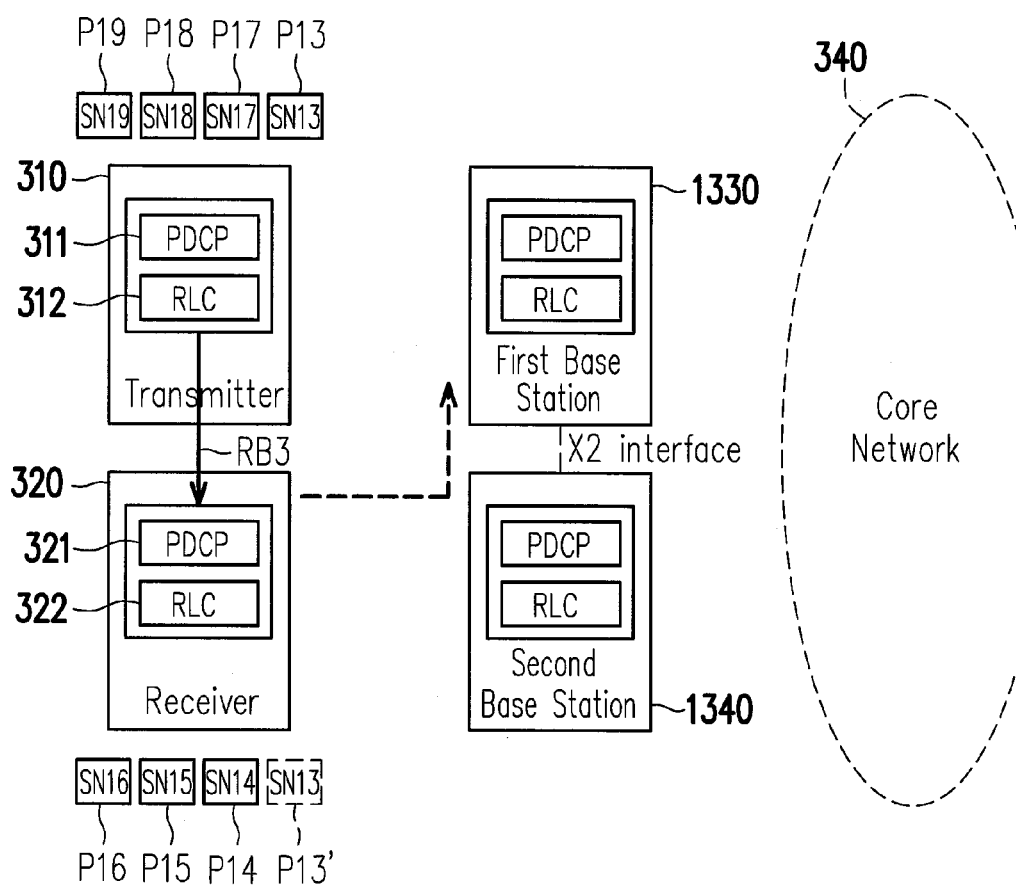
FIG. 13 is a schematic diagram of switching from the device-to-device communication mode to the cellular communication mode according to an embodiment of the present disclosure.

Referring to FIG. 13, FIG. 13 is a schematic diagram of switching from the device-to-device communication mode to the cellular communication mode according to an embodiment of the present disclosure. In the present embodiment, it is assumed that the transmitter 310 and the receiver 320 are served by a first base station 1330 and a second base station 1340 respectively, and the first base station 1330 and the second base station 1340 are communicated to each other via an X2 interface defined in the LTE.

As shown in FIG. 13, when the communication mode between the transmitter 310 and the receiver 320 is switched from the device-to-device communication to the cellular communication, the receiver 320 may forward the transmission-unfinished packet (e.g., the packets P14 to P16) and the transmission-unfinished packet status (e.g., SN13 and SN14 to SN16) to the first base station 1330 via the second base station 1340 and the X2 interface, sequentially.

After the packets P14 to P16 as well as SN13, SN14 to SN16 are received by the first base station 1330, operations for executing the cellular communication may also refer to related description for FIG. 9A and FIG. 9B, which is not repeated hereinafter.

In addition, persons skilled in the art should be understood that, although each embodiment in the present disclosure describes the spirit of the present disclosure by using unidirectional transmission (i.e., the packets are all sent from the transmitter 310 to the receiver 320) as examples, each method proposed by the disclosure is also suitable for situations in bidirectional transmission (i.e., the transmitter 310 and the receiver 320 may transmit the packets to each other).

Figure 14:
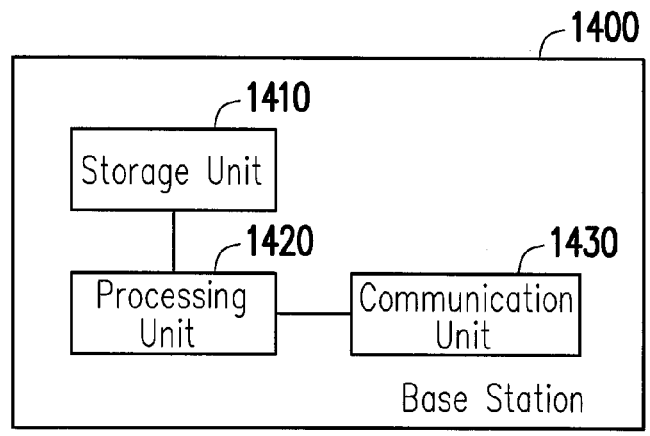
FIG. 14 is a functional block diagram illustrating a base station according to an embodiment of the present disclosure.

FIG. 14 is a functional block diagram illustrating a base station according to an embodiment of the present disclosure. In the present embodiment, a base station 1400 is, for example, the base station for implementing the foregoing embodiments. The base station 1400 includes a storage unit 1410, a processing unit 1420 and a communication unit 1430. The storage unit 1410 is, for example, a memory, a hard disk or other devices capable of storing data for recording a plurality of program codes or modules. The processing unit 1420 is connected to the storage unit 1410. The processing unit 1420 is, for example, a processor for general purposes, a processor for special purposes, a conventional processor, a data signal processor, a plurality of microprocessors, one or more microprocessors, controllers, microcontrollers and Application Specific Integrated Circuit (ASIC) which are combined to a core of the digital signal processor, a Field Programmable Gate Array (FPGA), any other integrated circuits, a state machine, a processor based on Advanced RISC Machine (ARM) and similar products.

The communication unit 1430 is connected to the processing unit 1420. The communication unit 1430 is configured to process Radio Frequency (RF) signals of cellular communication technology such as Global System for Mobile (GSM) system, 3GPP LTE, Code Division Multiple Access (CDMA), WCDMA, High Speed Packet Access (HSPA), World Interoperability for Microwave Access (WiMAX) and so on. In addition, the communication unit 1430 may further process RF signals of Wireless Local Area Network (WLAN) communication technology.

Figure 15:
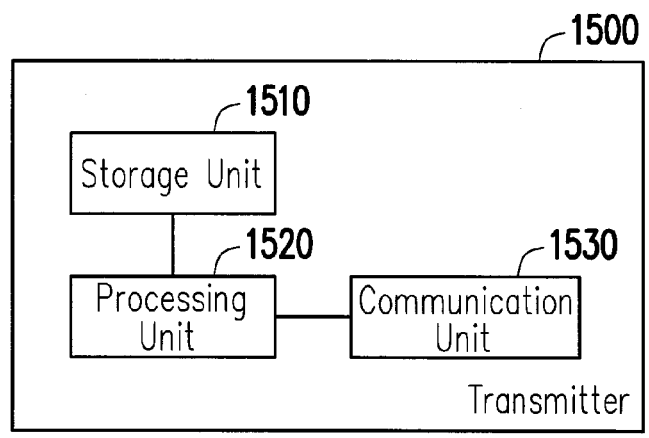
FIG. 15 is a functional block diagram illustrating a transmitter according to an embodiment of the present disclosure.

FIG. 15 is a functional block diagram illustrating a transmitter according to an embodiment of the present disclosure. In the present embodiment, a transmitter 1500 is, for example, the transmitter for implementing the foregoing embodiments. The transmitter 1500 includes a storage unit 1510, a processing unit 1520 and a communication unit 1530. The processing unit 1520 is coupled to the storage unit 1510 and the communication unit 1530. Various possible implementations of the storage unit 1510, the processing unit 1520 and the communication unit 1530 may refer to the storage unit 1410, the processing unit 1410 and the communication unit 1430 in the embodiment of FIG. 14, thus related description is omitted hereinafter.

Figure 16:
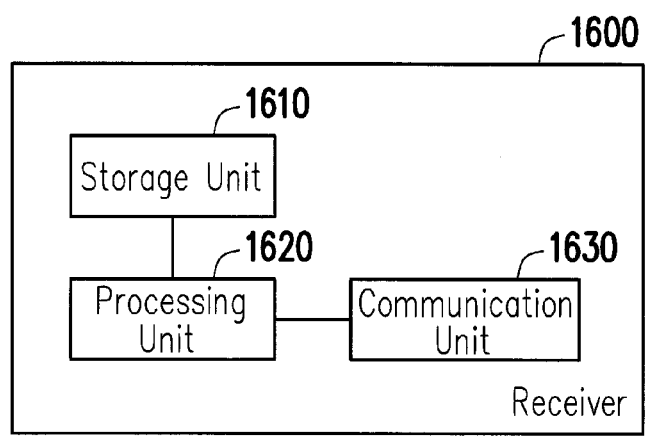
FIG. 16 is a functional block diagram illustrating a receiver according to an embodiment of the present disclosure.

FIG. 16 is a functional block diagram illustrating a receiver according to an embodiment of the present disclosure. In the present embodiment, a receiver 1600 is, for example, the receiver for implementing the foregoing embodiments. The receiver 1600 includes a storage unit 1610, a processing unit 1620 and a communication unit 1630. The processing unit 1620 is coupled to the storage unit 1610 and the communication unit 1630. Various possible implementations of the storage unit 1610, the processing unit 1620 and the communication unit 1630 may refer to the storage unit 1410, the processing unit 1410 and the communication unit 1430 in the embodiment of FIG. 14, thus related description is omitted hereinafter.

In summary, when the communication mode between the transmitter and the receiver is switched from the cellular communication mode to the device-to-device communication mode, or switched from the device-to-device communication mode to the cellular communication mode, the methods proposed according to the embodiments of the disclosure are capable of reducing the packet error loss rate by the transmission-unfinished packet and the transmission-unfinished packet status forwarded by the transmitter, the receive and/or the base station. Moreover, the technical means of sending the end marker to the core network may guarantee that the packets which are still routing in the core network cannot be lost when switching the communication mode from the cellular communication mode to the device-to-device communication mode, so as to further reduce the packet error loss rate.

Although the present disclosure has been described with reference to the above embodiments, it is apparent to one of the ordinary skill in the art that modifications to the described embodiments may be made without departing from the spirit of the present disclosure. Accordingly, the scope of the present disclosure will be defined by the attached claims not by the above detailed descriptions.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A method for switching communication connection modes, adapted to a communication system comprising a transmitter, a receiver and at least one base station, and the method comprising:

when the at least one base station or a core network entity determines that a communication mode between the transmitter and the receiver requires to be switched from a cellular communication mode to a device-to-device communication mode, sending a control message by the at least one base station to the transmitter;

stopping transmitting, by the transmitter, at least one first packet to the at least one base station in response to the control message;

buffering, by the at least one base station, a plurality of transmission-unfinished packets and a plurality of transmission-unfinished packet statuses related to the transmission-unfinished packets, wherein the transmission-unfinished packets are packets have been received, by the at least one base station, from the transmitter but have not been transmitted, by the at least one base station, to the receiver in the cellular communication mode, wherein each of the transmission-unfinished packet statuses is a packet data convergence protocol sequence number of each of the transmission-unfinished packets; and receiving, by the receiver, the transmission-unfinished packets and the transmission-unfinished packet statuses related to the transmission-unfinished packets forwarded by the at least one base station before the at least one base station or the core network entity has completed switching the communication mode between the transmitter and the receiver from the cellular communication mode to the device-to-device communication mode.

2. The method of claim 1, further comprising:

sending, by the at least one base station, an end marker to the core network; and stopping transmitting, by the at least one base station, at least one second packet received from the transmitter to the core network, wherein the at least one second packet comprises the transmission-unfinished packets.

3. The method of claim 2, further comprising:
forwarding, by the at least one base station, at least one third packet from the core network to the receiver until the end marker is received from the core network, wherein the at least one third packet corresponds to at least one packet sent, by the at least one base station, to the core network before the at least one base station sent the end marker.

4. The method of claim 1, wherein after the step of receiving, by the receiver, the transmission-unfinished packets and the transmission-unfinished packet statuses related to the transmission-unfinished packets forwarded by the at least one base station, the method further comprises:
setting, by the receiver, a packet data convergence protocol sequence number receiving status of a packet data convergence protocol entity of the receiver according to the transmission-unfinished packet statuses;
resetting, by the receiver, a radio link control entity of the receiver; and
returning, by the receiver, a confirmation message to the at least one base station.

5. The method of claim 4, wherein after the step of returning, by the receiver, the confirmation message to the at least one base station, the method further comprises:
resetting, by the at least one base station, a first packet data convergence protocol entity and a second packet data convergence protocol entity in the at least one base station in response to the confirmation message,
wherein the first packet data convergence protocol entity is corresponding to the transmitter, and the second packet data convergence protocol entity is corresponding to the receiver.

6. The method of claim 4, wherein after the step of returning, by the receiver, the confirmation message to the at least one base station, the method further comprises:
allocating, by the at least one base station, a communication resource for executing the device-to-device communication mode to the transmitter and the receiver.

7. The method of claim 1, wherein the at least one base station comprises a first base station connected to the transmitter and a second base station connected to the receiver, and the step of receiving, by the receiver, the transmission-unfinished packets and the transmission-unfinished packet statuses related to the transmission-unfinished packets forwarded by the at least one base station comprises:
receiving, by the receiver, the transmission-unfinished packets and the transmission-unfinished packet statuses related to the transmission-unfinished packets from the first base station via the second base station.

8. A communication system, comprising:
a transmitter;
a receiver; and
at least one base station,
wherein when the at least one base station or a core network entity determines that a communication mode between the transmitter and the receiver requires to be switched from a cellular communication mode to a device-to-device communication mode, the at least one base station sends a control message to the transmitter;
the transmitter stops transmitting at least one first packet to the at least one base station in response to the control message;
the at least one base station buffers a plurality of transmission-unfinished packets and a plurality of transmission-unfinished packet statuses related to the transmission-unfinished packets, wherein the transmission-unfinished packets are packets have been received, by the at least one base station, from the transmitter but have not been transmitted, by the at least one base station, to the receiver in the cellular communication mode, wherein each of the transmission-unfinished packet statuses is a packet data convergence protocol sequence number of each of the transmission-unfinished packets; and
the receiver receives the transmission-unfinished packets and the transmission-unfinished packet statuses related to the transmission-unfinished packets forwarded by the at least one base station before the at least one base station or the core network entity has completed switching the communication mode between the transmitter and the receiver from the cellular communication mode to the device-to-device communication mode.

9. The communication system of claim 8, wherein the at least one base station is further configured to:
send an end marker to the core network; and
stop transmitting at least one second packet received from the transmitter to the core network, wherein the at least one second packet comprises the transmission-unfinished packets.

10. The communication system of claim 9, further comprising:
the at least one base station forwarding at least one third packet from the core network to the receiver until the end marker is received from the core network, wherein the at least one third packet corresponds to at least one packet sent, by the at least one base station, to the core network before the at least one base station sent the end marker.

11. The communication system of claim 8, wherein the receiver is further configured to:
set a packet data convergence protocol sequence number receiving status of a packet data convergence protocol entity of the receiver according to the transmission-unfinished packet statuses;
reset a radio link control entity of the receiver; and
return a confirmation message to the at least one base station.

12. The communication system of claim 11, wherein the at least one base station is further configured to: reset a first packet data convergence protocol entity and a second packet data convergence protocol entity in the at least one base station in response to the confirmation message,
wherein the first packet data convergence protocol entity is corresponding to the transmitter, and the second packet data convergence protocol entity is corresponding to the receiver.

13. The communication system of claim 11, wherein the at least one base station is further configured to: allocate a communication resource for executing the device-to-device communication mode to the transmitter and the receiver.

14. The communication system of claim 8, wherein the at least one base station comprises a first base station connected to the transmitter and a second base station connected to the receiver, and the receiver receives the transmission-unfinished packets and the transmission-unfinished packet statuses related to the transmission-unfinished packets from the first base station via the second base station.

15. A base station, comprising:
a communication unit;
a storage unit, storing a plurality of program codes; and
a processing unit, connecting to the storage unit and the communication unit, and accessing the program codes to perform steps of:
when the base station or a core network entity determines that a communication mode between a transmitter and a receiver requires to be switched from a cellular communication mode to a device-to-device communication mode, sending a control message to the transmitter, so as to control the transmitter to stop transmitting at least one first packet to the base station;

buffering a plurality of transmission-unfinished packets and a plurality of transmission-unfinished packet statuses related to the transmission-unfinished packets, wherein the transmission-unfinished packets are packets have been received, by the base station, from the transmitter but have not been transmitted, by the base station, to the receiver in the cellular communication mode, wherein each of the transmission-unfinished packet statuses is a packet data convergence protocol sequence number of each of the transmission-unfinished packets; and forwarding the transmission-unfinished packets and the transmission-unfinished packet statuses related to the transmission-unfinished packets to the receiver before the base station or the core network entity has completed switching the communication mode between the transmitter and the receiver from the cellular communication mode to the device-to-device communication mode.

16. The base station of claim 15, further configured to:
send an end marker to the core network; and
stop transmitting at least one second packet received from the transmitter to the core network, wherein the at least one second packet comprises the transmission-unfinished packets.

17. The base station of claim 16, further configured to:
forward at least one third packet from the core network to the receiver until the end marker is received from the core network, wherein the at least one third packet corresponds to at least one packet sent, by the at least one base station, to the core network before the at least one base station sent the end marker.

18. The base station of claim 15, wherein when a confirmation message from the receiver is received by the base station, the base station is further configured to reset a first packet data convergence protocol entity and a second packet data convergence protocol entity in the base station in response to the confirmation message,
wherein the first packet data convergence protocol entity is corresponding to the transmitter, and the second packet data convergence protocol entity is corresponding to the receiver.

19. The base station of claim 18, wherein after the confirmation message is received by the base station, the base station is further configured to: allocate a communication resource for executing the device-to-device communication mode to the transmitter and the receiver.

20. A receiver, comprising:
a communication unit;
a storage unit, storing a plurality of program codes; and
a processing unit, connecting to the storage unit and the communication unit, and accessing the program codes to perform steps of:
when at least one base station or a core network entity determines that a communication mode between a transmitter and the receiver requires to be switched from a cellular communication mode to a device-to-device communication mode, receiving a plurality of transmission-unfinished packets and a plurality of transmission-unfinished packet statuses related to the transmission-unfinished packets forwarded by the at least one base station before the at least one base station or the core network entity has completed switching the communication mode between the transmitter and the receiver from the cellular communication mode to the device-to-device communication mode, wherein the transmission-unfinished packets are packets have been received, by the at least one base station, from the transmitter but have not been transmitted, by the at least one base station, to the receiver in the cellular communication mode, and each of the transmission-unfinished packet statuses is a packet data convergence protocol sequence number of each of the transmission-unfinished packets.

21. The receiver of claim 20, further configured to:
set a packet data convergence protocol sequence number receiving status of a packet data convergence protocol entity of the receiver according to the transmission-unfinished packet statuses;
reset a radio link control entity of the receiver; and
return a confirmation message to the at least one base station.

22. A method for switching communication connection modes, adapted to a communication system comprising a transmitter, a receiver and at least one base station, and the method comprising:
when the at least one base station or a core network entity determines that a communication mode between the transmitter and the receiver requires to be switched from a device-to-device communication mode to a cellular communication mode, sending a control message by the at least one base station to the transmitter;
stopping transmitting, by the transmitter, at least one first packet to the receiver in response to the control message; and
forwarding, by the transmitter, a plurality of transmission-unfinished packets and a plurality of transmission-unfinished packet statuses related to the transmission-unfinished packets to the at least one base station before the at least one base station or the core network entity has completed switching the communication mode between the transmitter and the receiver from the device-to-device communication mode to the cellular communication mode, wherein the transmission-unfinished packets are packets have not been transmitted, by the transmitter, to the receiver in the device-to-device communication mode, and each of the transmission-unfinished packet statuses is a packet data convergence protocol sequence number of each of the transmission-unfinished packets.

23. The method of claim 22, wherein after the step of forwarding, by the transmitter, the transmission-unfinished packets and the transmission-unfinished packet statuses related to the transmission-unfinished packets to the at least one base station, the method further comprises:
setting, by the at least one base station, a packet data convergence protocol sequence number transmitting status of a packet data convergence protocol entity corresponding to the receiver in the at least one base station according to the transmission-unfinished packet statuses.

24. The method of claim 23, wherein after the step of setting, by the at least one base station, the packet data convergence protocol sequence number transmitting status of the packet data convergence protocol entity corresponding to the receiver in the at least one base station according to the transmission-unfinished packet statuses, the method further comprises:
allocating, by the at least one base station, a communication resource for executing the cellular communication mode to the transmitter and the receiver.

25. The method of claim 22, wherein the at least one base station comprises a first base station connected to the transmitter and a second base station connected to the receiver, and the step of forwarding, by the transmitter, the transmission-unfinished packets and the transmission-unfinished packet statuses related to the transmission-unfinished packets to the at least one base station comprises:

forwarding, by the transmitter, the transmission-unfinished packets and the transmission-unfinished packet statuses to the second base station via the first base station.

26. The method of claim 25, wherein after the step of forwarding, by the transmitter, the transmission-unfinished packets and the transmission-unfinished packet statuses related to the transmission-unfinished packets to the at least one base station, the method further comprises:

setting, by the second base station, a packet data convergence protocol sequence number transmitting status of a packet data convergence protocol entity corresponding to the receiver in the second base station according to the transmission-unfinished packet statuses.

27. The method of claim 26, wherein after the step of setting, by the second base station, the packet data convergence protocol sequence number transmitting status of the packet data convergence protocol entity corresponding to the receiver in the second base station according to the transmission-unfinished packet statuses, the method further comprises:

allocating, by the first base station and the second base station, a communication resource for executing the cellular communication mode to the transmitter and the receiver, respectively.

28. A communication system, comprising:
a transmitter;
a receiver; and
at least one base station,
wherein when the at least one base station or a core network entity determines that a communication mode between the transmitter and the receiver requires to be switched from a device-to-device communication mode to a cellular communication mode, the at least one base station sends a control message to the transmitter;
the transmitter stops transmitting at least one first packet to the receiver in response to the control message; and
the transmitter forwards a plurality of transmission-unfinished packets and a plurality of transmission-unfinished packet statuses related to the transmission-unfinished packets to the at least one base station before the at least one base station or the core network entity has completed switching the communication mode between the transmitter and the receiver from the device-to-device communication mode to the cellular communication mode, wherein the transmission-unfinished packets are packets have not been transmitted, by the transmitter, to the receiver in the device-to-device communication mode, and each of the transmission-unfinished packet statuses is a packet data convergence protocol sequence number of each of the transmission-unfinished packets.

29. The communication system of claim 28, wherein the at least one base station is further configured to: set a packet data convergence protocol sequence number transmitting status of a packet data convergence protocol entity corresponding to the receiver in the at least one base station according to the transmission-unfinished packet statuses.

30. The communication system of claim 29, wherein the at least one base station allocates a communication resource for executing the cellular communication mode to the transmitter and the receiver.

31. The communication system of claim 28, wherein the at least one base station comprises a first base station connected to the transmitter and a second base station connected to the receiver, the transmitter forwards the transmission-unfinished packets and the transmission-unfinished packet statuses to the second base station via the first base station.

32. The communication system of claim 31, wherein the second base station sets a packet data convergence protocol sequence number transmitting status of a packet data convergence protocol entity corresponding to the receiver in the second base station according to the transmission-unfinished packet statuses.

33. The communication system of claim 32, wherein the first base station and the second base station allocate a communication resource for executing the cellular communication mode to the transmitter and the receiver, respectively.

34. A base station, comprising:
a communication unit;
a storage unit, storing a plurality of program codes; and
a processing unit, connecting to the storage unit and the communication unit, and accessing the program codes to perform steps of:
when the base station or a core network entity determines that a communication mode between a transmitter and a receiver requires to be switched from a device-to-device communication mode to a cellular communication mode, sending a control message to the transmitter, so as to control the transmitter to stop transmitting at least one first packet to the receiver; and
receiving a plurality of transmission-unfinished packets and a plurality of transmission-unfinished packet statuses related to the transmission-unfinished packets forwarded by the transmitter before the base station or the core network entity has completed switching the communication mode between the transmitter and the receiver from the device-to-device communication mode to the cellular communication mode, wherein the transmission-unfinished packets are packets have not been transmitted, by the transmitter, to the receiver in the device-to-device communication mode, and each of the transmission-unfinished packet statuses is a packet data convergence protocol sequence number of each of the transmission-unfinished packets.

35. The base station of claim 34, wherein the base station is further configured to: set a packet data convergence protocol sequence number transmitting status of a packet data convergence protocol entity corresponding to the receiver in the station according to the transmission-unfinished packet statuses.

36. The base station of claim 35, further configured to: allocate a communication resource for executing the cellular communication mode to the transmitter and the receiver.

37. A transmitter, comprising:
a communication unit;
a storage unit, storing a plurality of program codes; and
a processing unit, connecting to the storage unit and the communication unit, and accessing the program codes to perform steps of:
when at least one base station or a core network entity determines that a communication mode between the transmitter and a receiver requires to be switched from a device-to-device communication mode to a cellular communication mode, receiving a control message from the at least one base station;
stopping transmitting at least one first packet to the receiver in response to the control message; and forwarding a plurality of transmission-unfinished packets and a plurality of transmission-unfinished packet statuses related to the transmission-unfinished packets to the at least one base station before the at least one base station or the core network entity has completed switching the communication mode between the transmitter and the receiver from the device-to-device communication mode to the cellular communication mode, wherein the transmission-unfinished packets are packets have not been transmitted, by the transmitter, to the receiver in the device-to-device communication mode, and each of the transmission-unfinished packet statuses is a packet data convergence protocol sequence number of each of the transmission-unfinished packets.

38. A method for switching communication connection modes, adapted to a communication system comprising a transmitter, a receiver and at least one base station, and the method comprising:

when the at least one base station or a core network entity determines that a communication mode between the transmitter and the receiver requires to be switched from a device-to-device communication mode to a cellular communication mode, sending a control message by the at least one base station to the transmitter and the receiver;

stopping transmitting, by the transmitter, at least one first packet to the receiver in response to the control message; and forwarding, by the receiver, a plurality of transmission-unfinished packets and a plurality of transmission-unfinished packet statuses related to the transmission-unfinished packets to the at least one base station in response to the control message before the at least one base station or the core network entity has completed switching the communication mode between the transmitter and the receiver from the device-to-device communication mode to the cellular communication mode, wherein the transmission-unfinished packets are packets have been received, by the receiver, from the transmitter in the device-to-device communication mode and are out-of-sequence, and each of the transmission-unfinished packet statuses is a packet data convergence protocol sequence number of each of the transmission-unfinished packets.

39. The method of claim 38, wherein after the step of forwarding, by the receiver, the transmission-unfinished packets and the transmission-unfinished packet statuses related to the transmission-unfinished packets to the at least one base station in response to the control message, the method further comprises:

setting, by the at least one base station, a packet data convergence protocol sequence number receiving status of a packet data convergence protocol entity corresponding to the transmitter in the at least one base station according to the transmission-unfinished packet statuses.

40. The method of claim 39, wherein after the step of setting, by the at least one base station, the packet data convergence protocol sequence number receiving status of the packet data convergence protocol entity corresponding to the transmitter in the at least one base station according to the transmission-unfinished packet statuses, the method further comprises:

allocating, by the at least one base station, a communication resource for executing the cellular communication mode to the transmitter and the receiver.

41. The method of claim 38, wherein the at least one base station comprises a first base station connected to the transmitter and a second base station connected to the receiver, and the step of forwarding, by the receiver, the transmission-unfinished packets and the transmission-unfinished packet statuses related to the transmission-unfinished packets to the at least one base station comprises:

forwarding, by the receiver, the transmission-unfinished packets and the transmission-unfinished packet statuses to the first base station via the second base station.

42. The method of claim 41, wherein after the step of forwarding, by the receiver, the transmission-unfinished packets and the transmission-unfinished packet statuses related to the transmission-unfinished packets to the at least one base station, the method further comprises:

setting, by the first base station, a packet data convergence protocol sequence number receiving status of a packet data convergence protocol entity corresponding to the transmitter in the first base station according to the transmission-unfinished packet statuses.

43. The method of claim 42, wherein after the step of setting, by the first base station, the packet data convergence protocol sequence number receiving status of the packet data convergence protocol entity corresponding to the transmitter in the first base station according to the transmission-unfinished packet statuses, the method further comprises:

allocating, by the first base station and the second base station, a communication resource for executing the cellular communication mode to the transmitter and the receiver, respectively.

44. A communication system, comprising:
a transmitter;
a receiver; and
at least one base station,
wherein when the at least one base station or a core network entity determines that a communication mode between the transmitter and the receiver requires to be switched from a device-to-device communication mode to a cellular communication mode, the at least one base station sends a control message to the transmitter and the receiver;

the transmitter stops transmitting at least one first packet to the receiver in response to the control message; and the receiver forwards a plurality of transmission-unfinished packet and a plurality of transmission-unfinished packet statuses related to the transmission-unfinished packets to the at least one base station in response to the control message before the at least one base station or the core network entity has completed switching the communication mode between the transmitter and the receiver from the device-to-device communication mode to the cellular communication mode, wherein the transmission-unfinished packets are packets have been received, by the receiver, from the transmitter in the device-to-device communication mode and are out-of-sequence, and each of the transmission-unfinished packet statuses is a packet data convergence protocol sequence number of each of the transmission-unfinished packets.

45. The communication system of claim 44, wherein the at least one base station is further configured to: set a packet data convergence protocol sequence number receiving status of a packet data convergence protocol entity corresponding to the transmitter in the at least one base station according to the transmission-unfinished packet statuses.

46. The communication system of claim 45, wherein the at least one base station is further configured to allocate a communication resource for executing the cellular communication mode to the transmitter and the receiver.

47. The communication system of claim 44, wherein the at least one base station comprises a first base station connected to the transmitter and a second base station connected to the receiver, the receiver forwards the transmission-unfinished packets and the transmission-unfinished packet statuses to the first base station via the second base station.

48. The communication system of claim 47, wherein the first base station is further configured to set a packet data convergence protocol sequence number receiving status of a packet data convergence protocol entity corresponding to the transmitter in the first base station according to the transmission-unfinished packet statuses.

49. The communication system of claim 48, wherein the first base station and the second base station allocate a communication resource for executing the cellular communication mode to the transmitter and the receiver, respectively.

50. A base station, comprising:
a communication unit;
a storage unit, storing a plurality of program codes; and
a processing unit, connecting to the storage unit and the communication unit, and accessing the program codes to perform steps of:
when the base station or a core network entity determines that a communication mode between a transmitter and a receiver requires to be switched from a device-to-device communication mode to a cellular communication mode, sending a control message to the transmitter and the receiver, so as to control the transmitter to stop transmitting at least one first packet to the receiver, and controlling the receiver to forward a plurality of transmission-unfinished packets and a plurality of transmission-unfinished packet statuses related to the transmission-unfinished packets to the base station before the base station or the core network entity has completed switching the communication mode between the transmitter and the receiver from the device-to-device communication mode to the cellular communication mode, wherein the transmission-unfinished packets are packets have been received, by the receiver, from the transmitter in the device-to-device communication mode and are out-of-sequence, and each of the transmission-unfinished packet statuses is a packet data convergence protocol sequence number of each of the transmission-unfinished packets.

51. The base station of claim 50, wherein the base station is further configured to: set a packet data convergence protocol sequence number receiving status of a packet data convergence protocol entity corresponding to the transmitter in the base station or corresponding to transmitter in at least one other base station according to the transmission-unfinished packet statuses.

52. The base station of claim 51, further configured to allocate a communication resource for executing the cellular communication mode to the transmitter and the receiver.

53. A receiver, comprising:
a communication unit;
a storage unit, storing a plurality of program codes; and
a processing unit, connecting to the storage unit and the communication unit, and accessing the program codes to perform steps of:
when at least one base station or a core network entity determines that a communication mode between a transmitter and the receiver requires to be switched from a device-to-device communication mode to a cellular communication mode, receiving a control message from the at least one base station; and
forwarding a plurality of transmission-unfinished packets and a plurality of transmission-unfinished packet statuses related to the transmission-unfinished packets to the at least one base station in response to the control message before the at least one base station or the core network entity has completed switching the communication mode between the transmitter and the receiver from the device-to-device communication mode to the cellular communication mode, wherein the transmission-unfinished packets are packets have been received, by the receiver, from the transmitter in the device-to-device communication mode and are out-of-sequence, and each of the transmission-unfinished packet statuses is a packet data convergence protocol sequence number of each of the transmission-unfinished packets.

* * * * *